United States Patent [19]
Barrows

[11] Patent Number: 6,020,953
[45] Date of Patent: Feb. 1, 2000

[54] FEATURE TRACKING LINEAR OPTIC FLOW SENSOR

[75] Inventor: Geoffrey L. Barrows, Washington, D.C.

[73] Assignee: The United States of America as represented by the Secretary of the Navy, Washington, D.C.

[21] Appl. No.: 09/141,627

[22] Filed: Aug. 27, 1998

[51] Int. Cl.⁷ ............................. G01P 3/36; G01B 11/14
[52] U.S. Cl. ........................... 356/28; 356/373; 702/142
[58] Field of Search ...................... 356/28, 373; 702/142

[56] References Cited

U.S. PATENT DOCUMENTS

| | | | |
|---|---|---|---|
| 4,623,778 | 11/1986 | Cullen et al. | 219/124.34 |
| 5,086,219 | 2/1992 | Koch et al. | 250/208.2 |
| 5,248,873 | 9/1993 | Allen et al. | 250/208.1 |
| 5,491,642 | 2/1996 | Wormell et al. | |
| 5,561,287 | 10/1996 | Turner et al. | 250/208.2 |
| 5,598,354 | 1/1997 | Fang et al. | |

*Primary Examiner*—Stephen C. Buczinski
*Attorney, Agent, or Firm*—Barry A. Edelberg

[57] ABSTRACT

This invention is a one-dimensional elementary motion detector that measures the linear optical flow in a small subsection of the visual field. This sensor measures motion by tracking the movement of a feature across the visual field and measuring the time required to move from one location to the next. First a one-dimensional image is sampled from the visual field using a linear photoreceptor array. Feature detectors, such as edge detectors, are created with simple circuitry that performs simple computations on photoreceptor outputs. The detection of the feature's location is performed using a winner-take-all (WTA) mechanism on feature detector outputs. Motion detection is the performed by monitoring the location of the high WTA output in time to detect transitions corresponding to motion. The correspondence problem is solved by ignoring transitions to and from the end lines of the WTA output bus. Speed measurement is performed by measuring the time between WTA output transitions. This invention operates in a one-dimensional subspace of the two-dimensional visual field. The conversion of a two-dimensional image section to a one-dimensional image is performed by a specially shaped photoreceptor array which preserves image information in one direction but filters out image information in the perpendicular direction. Thus this sensor measures the projection of the 2-D optical flow vector onto the vector representing the sensor's orientation. By placing several of these sensors in different orientations and using vector arithmetic, the 2-D optical flow vector can be determined.

27 Claims, 28 Drawing Sheets

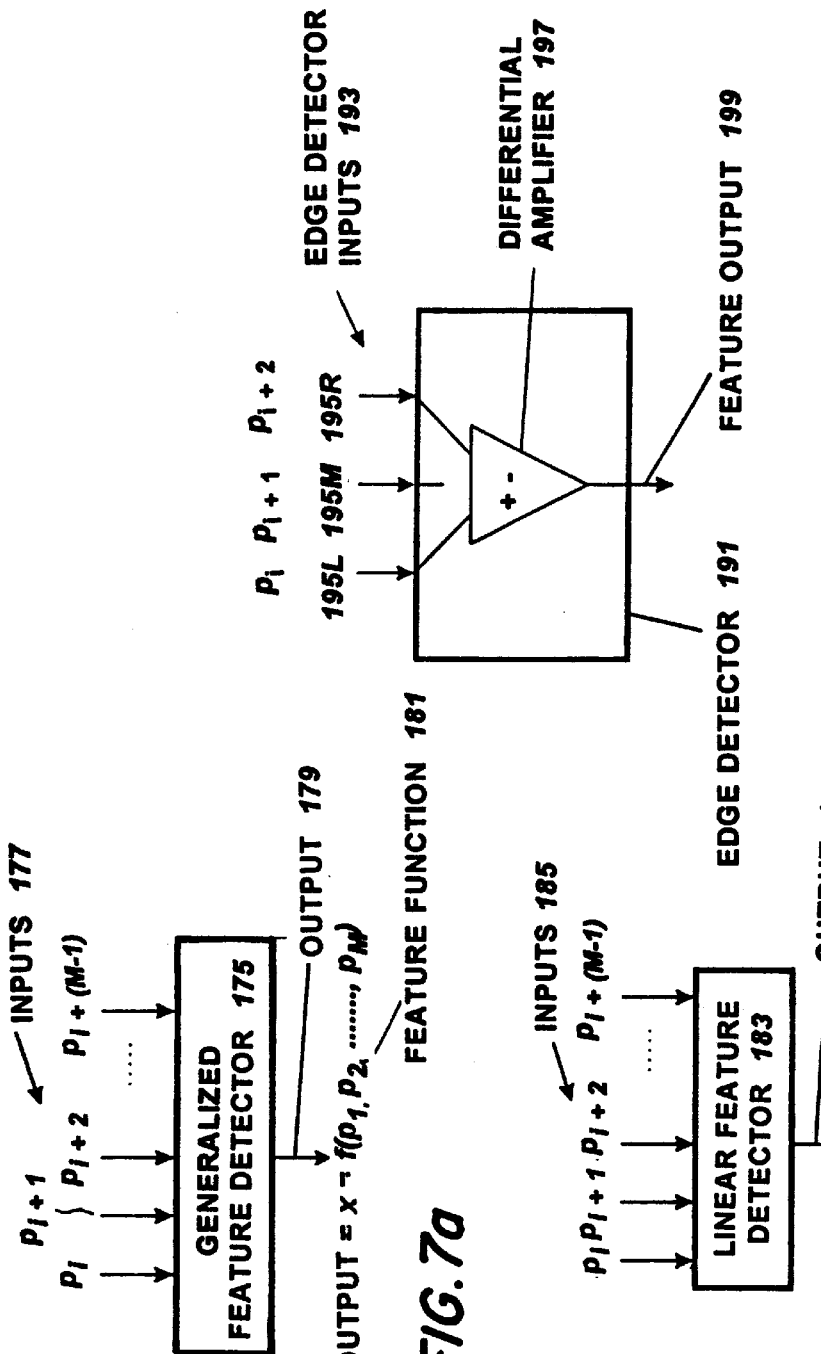

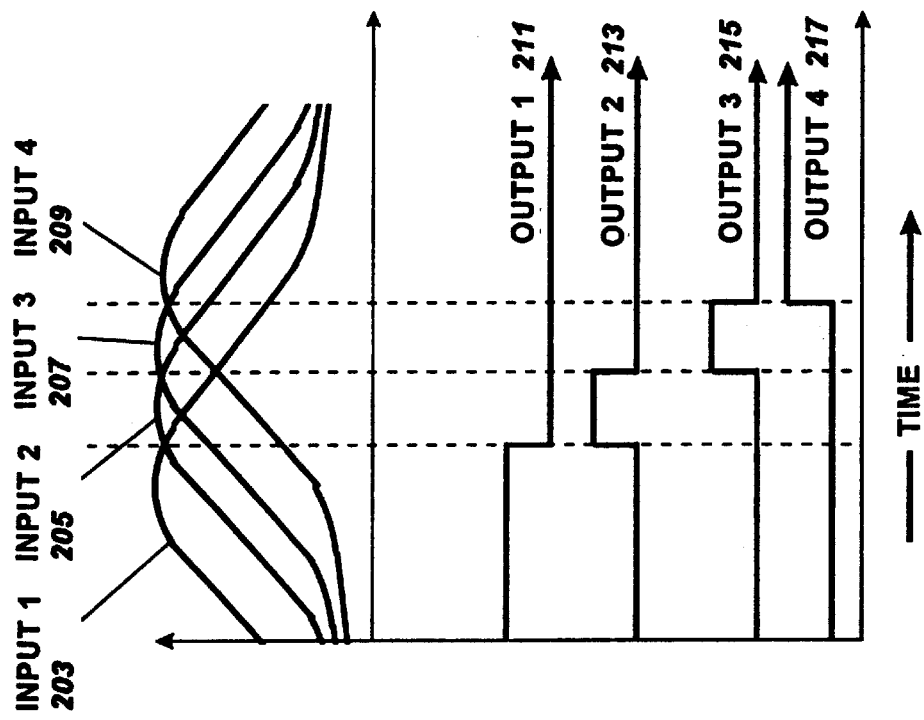
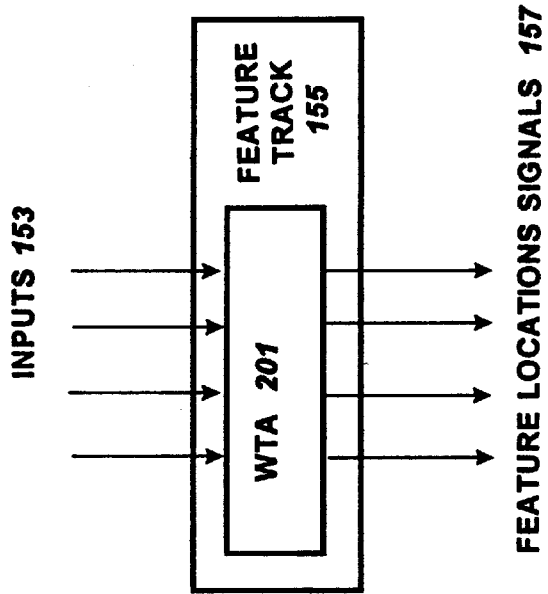

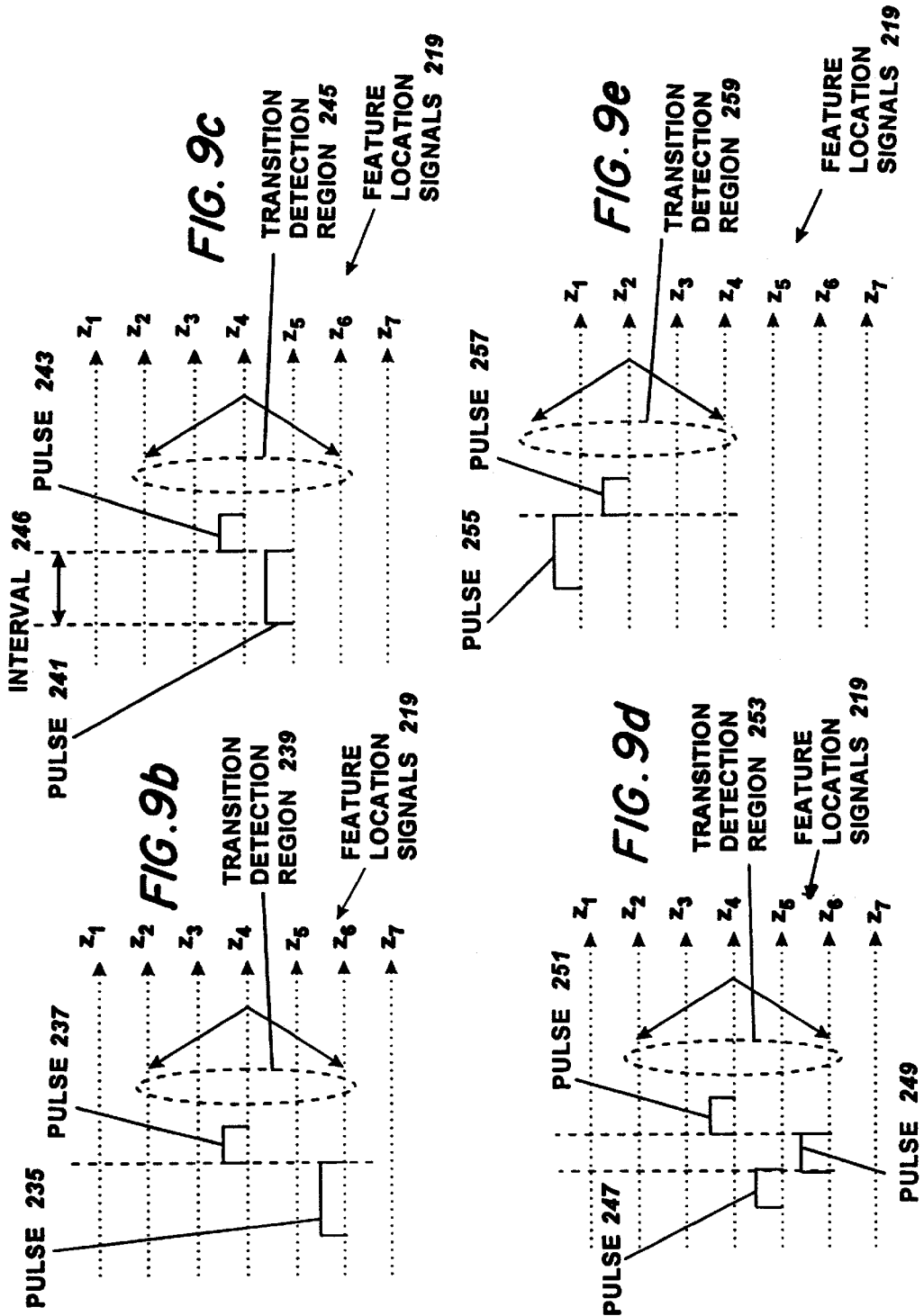

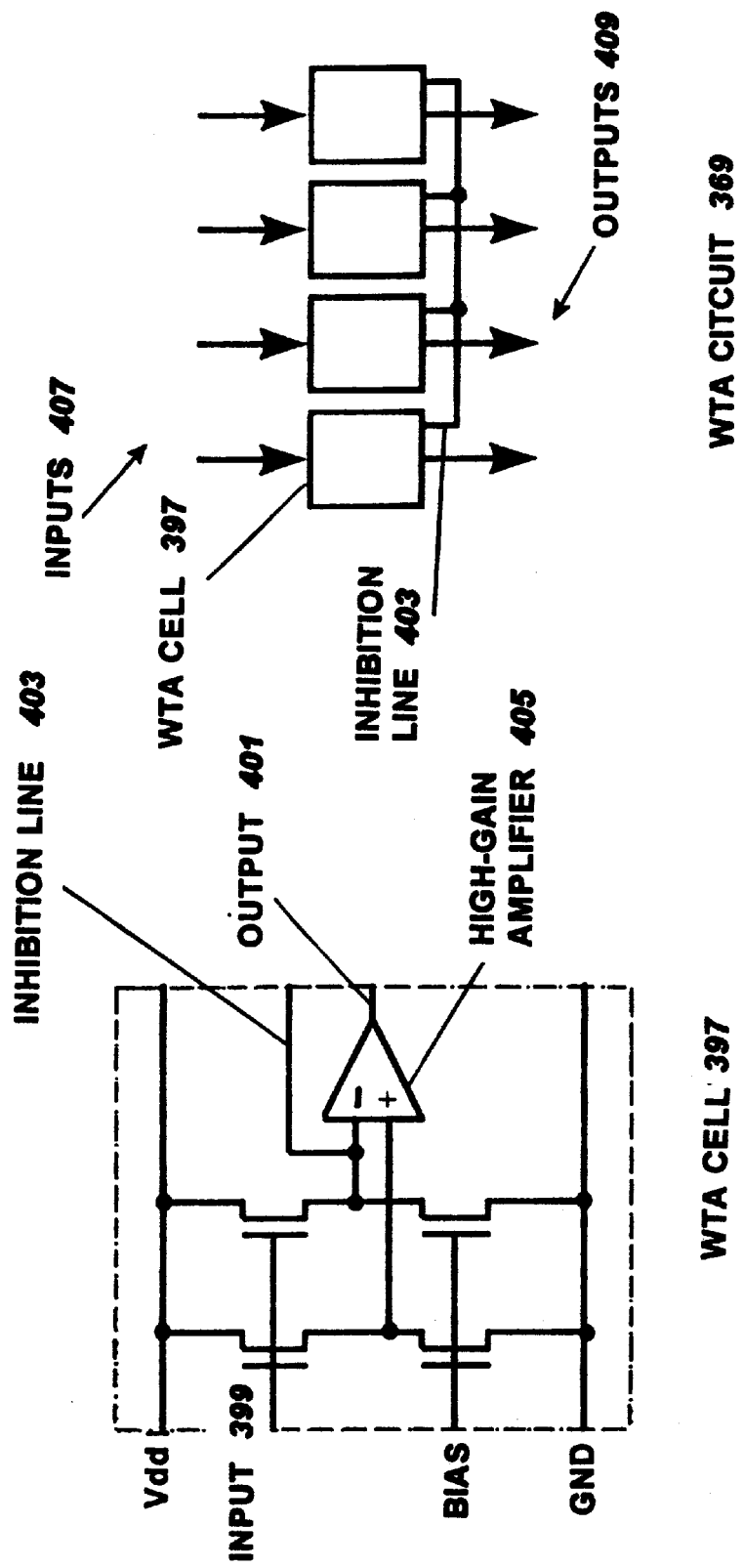

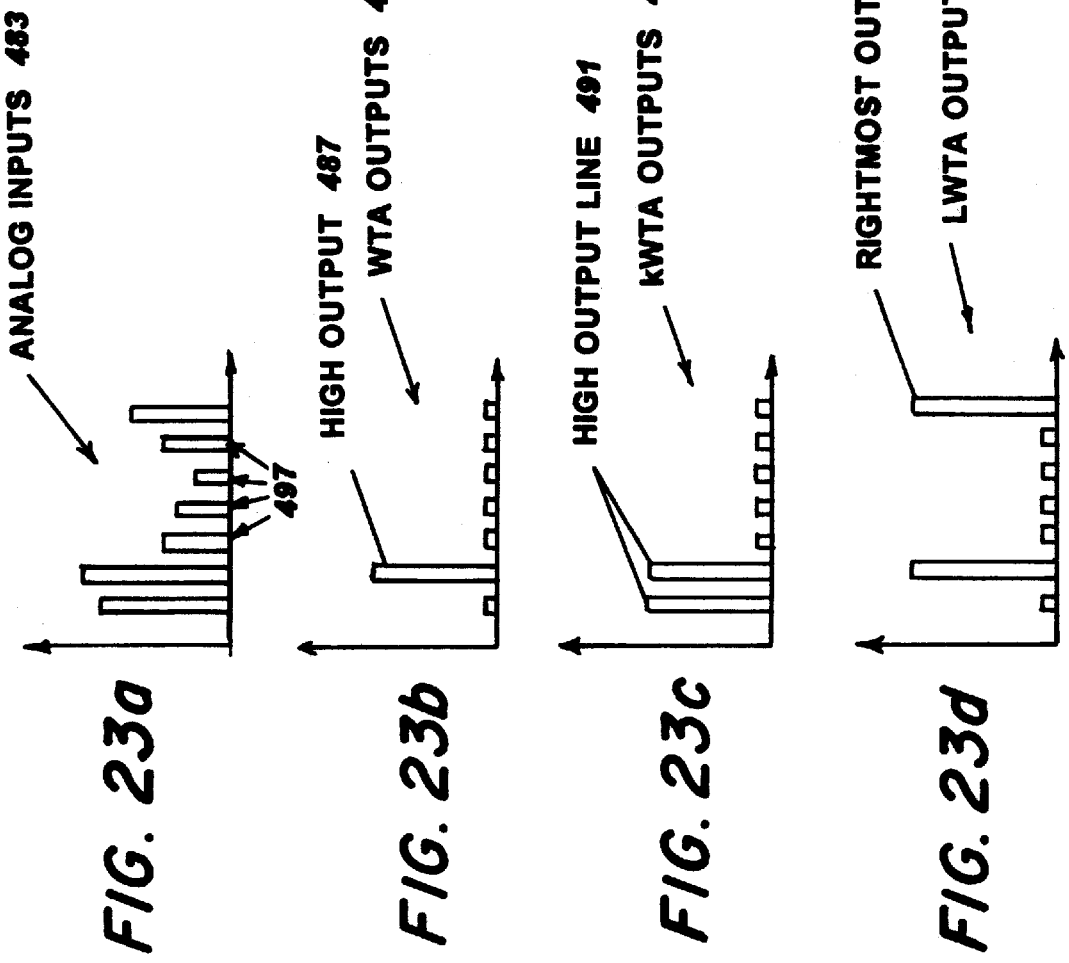

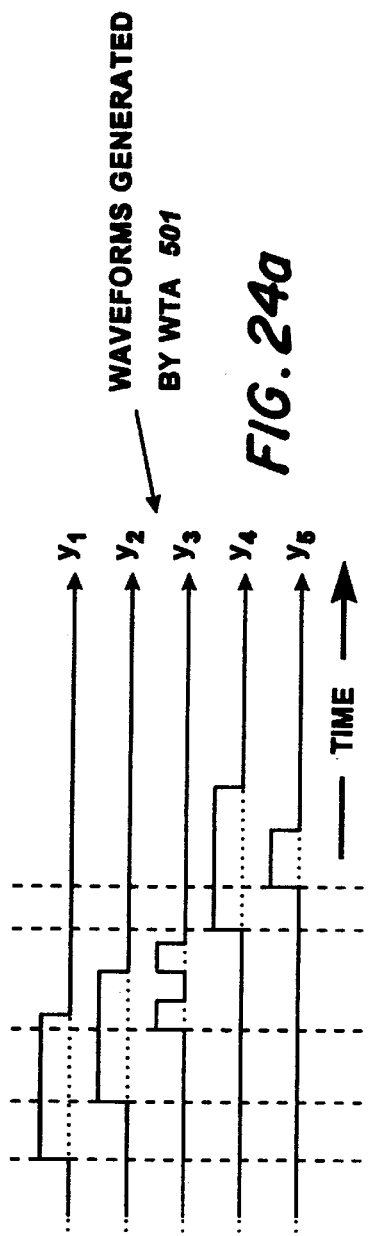
FIG. 24a — WAVEFORMS GENERATED BY WTA 501
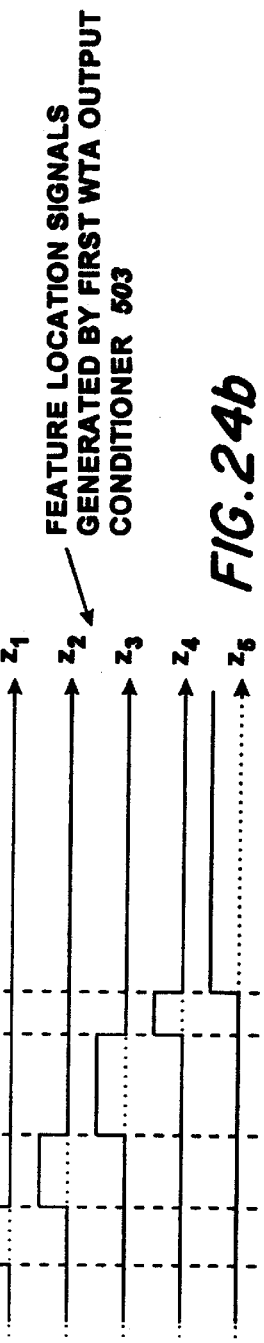
FIG. 24b — FEATURE LOCATION SIGNALS GENERATED BY FIRST WTA OUTPUT CONDITIONER 503
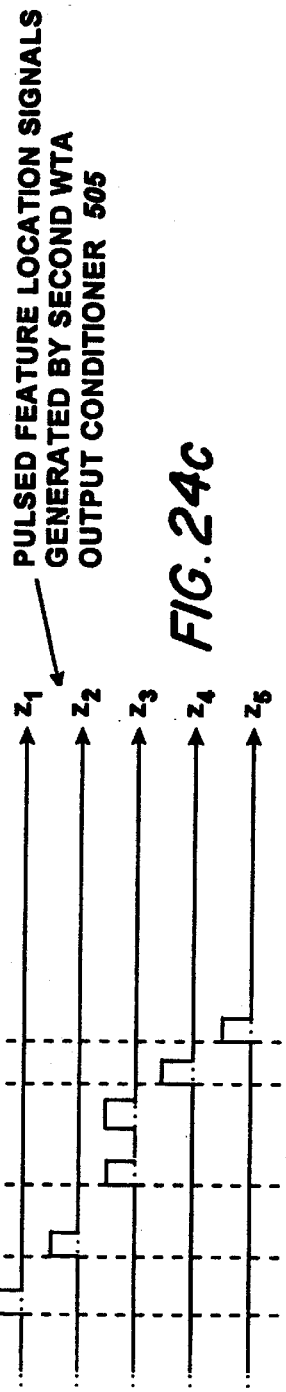
FIG. 24c — PULSED FEATURE LOCATION SIGNALS GENERATED BY SECOND WTA OUTPUT CONDITIONER 505

FEATURE TRACKING LINEAR OPTIC FLOW SENSOR

CROSS-REFERENCE TO RELATED APPLICATION

This patent application is related to the co-pending U.S. patent application entitled "A Photoreceptor Array for Linear Optic Flow Measurement", Ser. No. 09/141,621, filed Aug. 27, 1998, both of which applications being commonly assigned to the Government of the U.S.

BACKGROUND OF THE INVENTION

1. Field of the Invention

This invention relates to the general field of optical flow computation. More specifically, this invention relates to the field of integrated circuits that detect visual motion and measure optic flow.

2. Description of the Related Art

The term "optical flow" generally refers to the motion of texture seen by an agent (such as an animal or a robot) as a result of relative motion between the agent and other objects in the environment. It is well known that animals, especially insects, use information from the optical flow for depth perception and to move about in an environment without colliding into obstacles. Robotics and machine vision researchers have borrowed from these ideas in biology to build machine vision systems that successfully use optical flow for depth perception and obstacle avoidance. These successes verify that optical flow can indeed be used for depth perception and obstacles avoidance in real systems.

In robotics and machine vision, optical flow is mathematically expressed as a vector field either in the two-dimensional visual field 105 or on an image focal plane created by a lens. Both variations are used interchangeably in the subsequent description of the present invention.

The value of the optic flow vector 103 (FIG. 1) at a location in the visual field 105 (FIG. 1) refers to the velocity at which texture 107 (FIG. 1) is moving in that location of the visual field 105. To measure optical flow, typical machine vision systems grab sets of two-dimensional pixel array images using a camera, and use these sequential images to measure the optical flow field. In general, algorithms for computing optical flow from a set of images are computationally intensive, resulting in the need for a large amount of computing power for the computation of optical flow. This is because optical flow is a phenomena that has both spatial and temporal aspects, hence a large amount of data (two-dimensions of image and one dimension of time) needs to be processed. This is especially true if the image is sensed with a charge coupled device (CCD) or another pixel-structured type of image sensor. Almost all modern machine vision systems use such pixel-structured cameras. A discussion of the variety of algorithms used to measure optical flow is beyond the scope of this specification, however one successful and popular approach, the correlation method, is related to the operation of this sensor.

The correlation method of measuring optic flow will be qualitatively discussed by now referring to FIGS. 2a through 2c. FIGS. 2a and 2b show two successive frames or images of a video sequence. FIG. 2a shows the first frame 115, a location 117 in the first frame 115, and a block of texture 119 in the first frame. FIG. 2b shows the second frame 121, the search space 123 for a block that matches the first frame's block 119, and a best matching block 125. FIG. 2c shows a resulting optic flow vector 127. In the correlation method, to measure the optic flow at a location 117 in the visual field 105 generating the first frame 115, first a block of texture 119 is selected that contains the location 117. Next a search is conducted in the second frame 121 over a search space 123 for the block 125 that best matches the first image's block 119. A correlation function is typically used to measure how well two blocks match, hence the name of the algorithm. The displacement between the first frame's block 119 and the second frame's best matching block 125 is used to form the resulting optic flow vector 127, shown in FIG. 2c. This process is repeated over the entire image 115 to compute a complete optic flow field. To summarize, essentially this algorithm tracks texture and picture details such as points and edges, and uses the resulting displacements to measure optic flow. In more advanced versions of this algorithm, ideas from signal processing and estimation theory can be used to improve performance. For example, Kalman filters can be used to aid the tracking of features over multiple sequential images. A discussion of these techniques is beyond the scope of this invention but can be found in the general open literature.

This method of computing optical flow is intuitive. However, it is brute force, and hence computationally intensive when performed on two-dimensional images. However the computational complexity is greatly reduced when performed on one-dimensional images. This is for two reasons: first, because block matching computations need to be performed with blocks of one-dimension rather than two; and second, the variety of displacements to be searched covers one-dimension rather than two. The photoreceptor array of this subsequently discussed invention and of the above-discussed co-pending related patent application "A Photoreceptor Array for Linear Optic Flow Measurement" provide a useful one-dimensional image. Details on this invention will be discussed later.

The feature tracking method of measuring optic flow, also called the token method, is closely related to the correlation method. This method is less popular however is a precursor to the present invention. This correlation method will be briefly discussed by now referring to FIG. 3. FIG. 3 shows a basic outline of a one-dimensional version. An array of feature triggers 129 is located so that the corresponding locations 131 of each feature trigger 133 form an array in the visual field 105. Each feature trigger 133 presents an output 135 to a feature tracking algorithm 137. The feature tracking algorithm 137 generates an output measurement of the optic flow 139. The array of feature triggers 129 are identical and all tuned to respond to some generic image feature. Each feature trigger 133 normally has an output of zero. However when the desired feature moves across a feature trigger location 131, the feature trigger 133 will output a pulse. The feature tracking algorithm 137 then looks for a sequence of pulses moving left or right, and generates an output optic flow measurement dependent on the speed which these pulses are moving in space. The basic difference between the correlation method and the feature tracking method is that in the former the algorithm measures where a block of texture 119 has moved in a given time interval, while in the latter the algorithm measures how long it took a feature to move from one location 131 to the next.

FIGS. 4a and 4b show examples of simple two-dimensional feature detection functions that can be used in the feature triggers. A feature trigger 133 can be implemented by taking the inner product between the feature detection function and the image in the feature trigger's location, then passing the result through a thresholding function. FIG. 4a shows a first derivative detector 141, a feature detector that will be used in the subsequently described present invention. A feature trigger 133 using this feature detection function will respond to vertical edges with the bright side on the +X direction 143. FIG. 4b shows a second derivative detector 145. FIG. 4b is in the shape of the most popular feature detector-a on-dimensional Laplacian funtion. The inner product between this feature and the region of the visual field will cross zero as an edge crosses this feature detector. A feature trigger using this feature detection function will respond best to a bright vertical bar. Another example of a feature detection function is one that responds to an increase in image intensity in the feature trigger's location.

This method is still computationally complex because of the computation needed to compute such features in a two-dimensional image. As described above, such computations are essentially inner products between two matrices. However, the computational complexity is greatly reduced when optic flow is computed with one-dimensional images. The reasons are synonymous with those for the correlation method.

Some researchers have taken the alternative approach of building application specific integrated circuits (ASICs) that use a combination of digital and analog circuitry to measure optical flow. The idea behind this approach is that specifically designed analog and digital circuits can perform the computations necessary to measure optical flow in a much more compact fashion than is possible with a general purpose Von-Neumann type computer. This is especially useful if the implemented algorithm is one that can be mapped onto an array of parallel processors. These efforts have resulted in single or multiple chip systems that do measure optical flow. However the vast majority of these chips still use a two-dimensional pixel-structured representation of the image, which is not necessarily a good representation for optical flow computation. Furthermore in many of these cases the circuits implement hard-wired versions of conventional algorithms. Thus, the speed increase comes only from implementing an algorithm in firmware rather than software, whether or not the algorithm maps elegantly into the hardware. Finally, a significant problem with most of these chips is that they do not function well with low contrast images.

A variant of the use of specialized integrated circuits to measure optical flow is the "neuromorphic engineering" approach. In this approach the architecture and dynamics of circuits mimic what is believed to be happening in the visual processing part of the brain. The neuromorphic engineering community also is developing algorithms that match the dynamics of these neural structures. By far the two most popular features include a sharp increase in image intensity and a zero-crossing of the Laplacian of the visual field intensity in the feature detector's area. Furthermore effort is made to make variations of these algorithms that map elegantly onto VLSI hardware. Thus, creative methods are used to perform various measurements. For example, a discharging capacitor can be used to measure time. This combination of a more elegant means of computation and implementation in hardware results in the implementation of optical flow algorithms in compact circuits. However much work needs to be done with this approach. First, most of these circuits require unrealistically high contrast images in order to function properly. For example, test stimuli often consist of black bars on a white background. Second, most of these algorithms have only been implemented in one dimension and are intended to be used with optic flow parallel to the array's direction. Those chips that do compute two-dimensional optic flow have a very small number of pixels. As a source of ideas, though, this neuromorphic approach is excellent.

The present invention will subsequently addresses the high computational complexity required for optic flow algorithms that operate in two dimensions by borrowing ideas from both image processing and neuromorphic engineering. The sensor is able to detect motion from almost all real world textures. The sensor operates very well with textures having very low contrast. In the first embodiment, optical flow has been successfully measured with texture contrasts down to several percent. Yet the sensor provides information useful for two-dimensional optic flow measurement: a single sensor produces a measurement of the projection of the optic flow vector onto the sensor orientation vector. Hence, several of these sensors can be oriented in different directions to capture the full two-dimensional optic flow information. The sensor maps elegantly into an all VLSI implementation. It also implements easily in a hybrid implementation, where back-end processing is performed on a conventional digital computer. In the hybrid implementation case the computational complexity is orders of magnitude less that that of conventional optic flow algorithms. Thus, this sensor can be implemented a wide variety of ways, depending on the requirements and physical nature of the system using this sensor.

SUMMARY OF THE INVENTION

It is therefore an object of the invention to provide an improved linear optic flow sensor system.

Another object of this invention is to provide a sensor system which measures a one-dimensional component of a two-dimensional optic flow field in a section of a focal plane.

Another object of the invention is to provide a sensor system which is implemented as a combination of photoreceptor circuitry and mixed-mode analog and digital circuitry, all of which can be placed onto a single chip.

Another object of this invention is to provide a feature tracking linear image flow sensor system.

A further object of this invention is to provide a sensor system to measure optic flow by timing how long it takes for a feature, such as an edge, to move from one location to an adjacent location.

These and other objects of this invention are achieved by providing a feature tracking, linear optic flow sensor system which comprises an array of photoreceptors responsive to a visual field for generating a plurality of photoreceptor signals; a plurality of substantially identical feature detectors responsive to the plurality of photoreceptor signals for generating a plurality of feature signals; a feature tracker responsive to the plurality of feature signals for generating a plurality of feature location signals, the feature tracker selected from a group consisting of simple winner-take-all circuits, local winner-take-all circuits, k winner-take-all circuits, and k local winner-take-all circuits; and a transition detection and speed measurement circuit responsive to the feature location signals for providing an output comprised of at least one measurement selected from the group consisting of a speed measurement, a direction measurement, and speed and direction measurements, whereby at least one optic flow measurement is obtained from the measurements and the physical geometry of the feature detectors.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIGS. 7a through 7c illustrate a single feature detector, with FIG. 7a showing the most general case, FIG. 7b showing the linear case, and FIG. 7c showing one specific example;

FIGS. 8a and 8b each illustrate a winner-take-all circuit;

FIGS. 9a through 9f show the operation of the transition detection and speed measurement circuit;

FIGS. 19a and 19b illustrate a winner-take-all circuit;

FIGS. 23a through 23g illustrate the operation of four different winner-take-all (WTA) circuits and the thresholding circuit, all of which are considered generalized WTA circuits;

FIGS. 24a through 24c illustrate the operation of two variants of the WTA output conditioner;

DESCRIPTION OF THE INVENTION

General Purpose of the Invention

Figure 1:
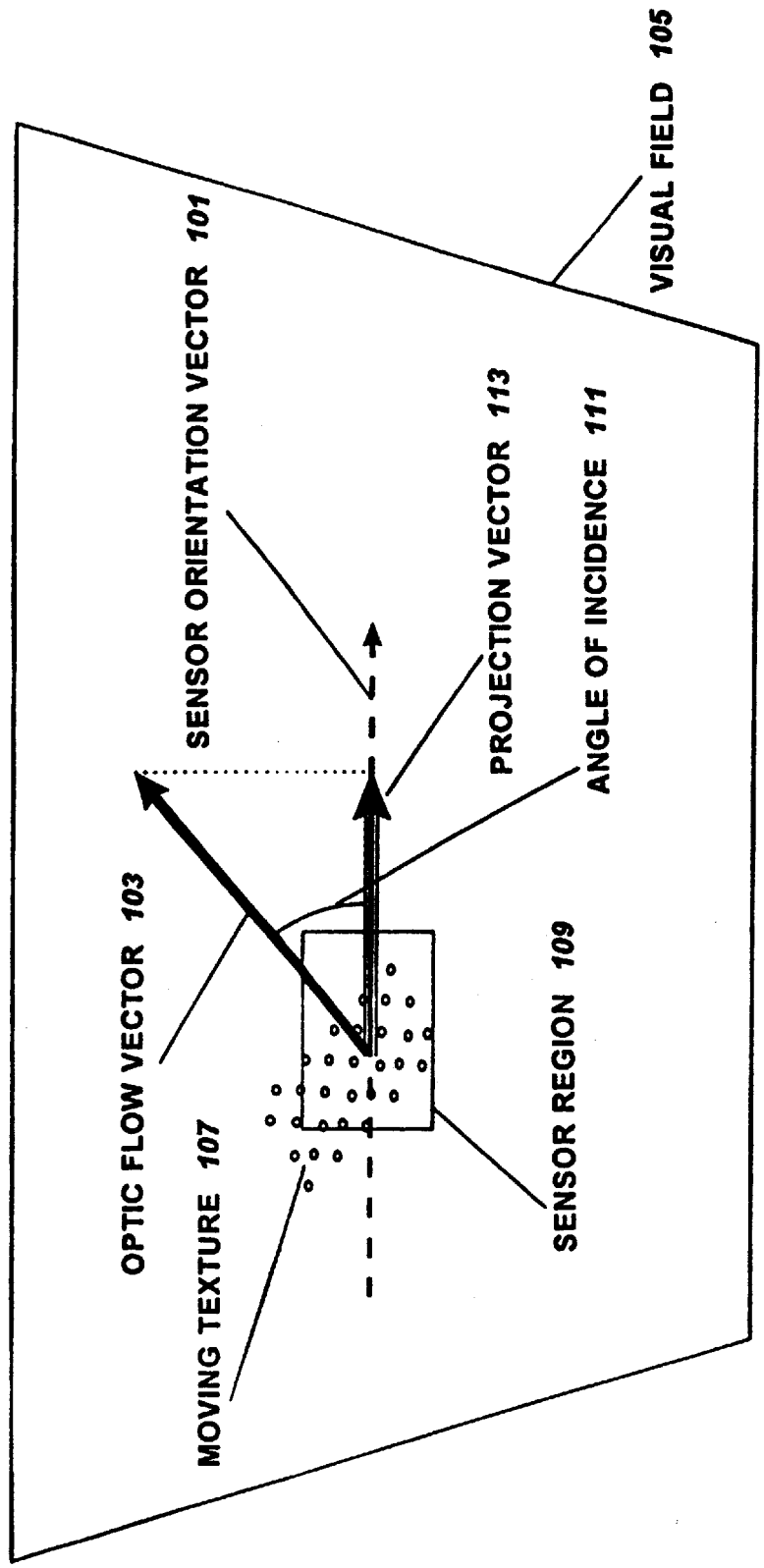
FIG. 1 shows the projection of the 2-D optic flow vector onto the vector representing the sensor orientation.
Figure 2:
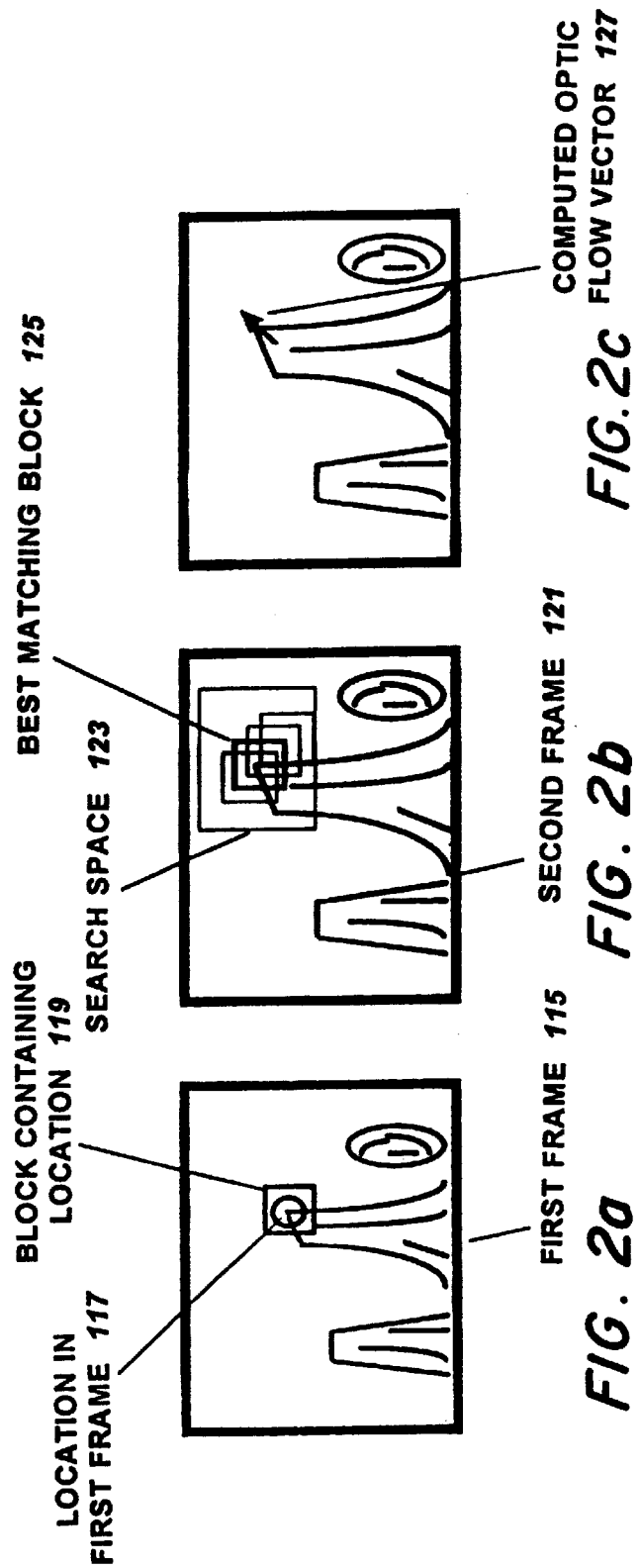
FIGS. 2a through 2c show the correlation method of optic flow measurement as used in conventional image processing.
Figure 3:
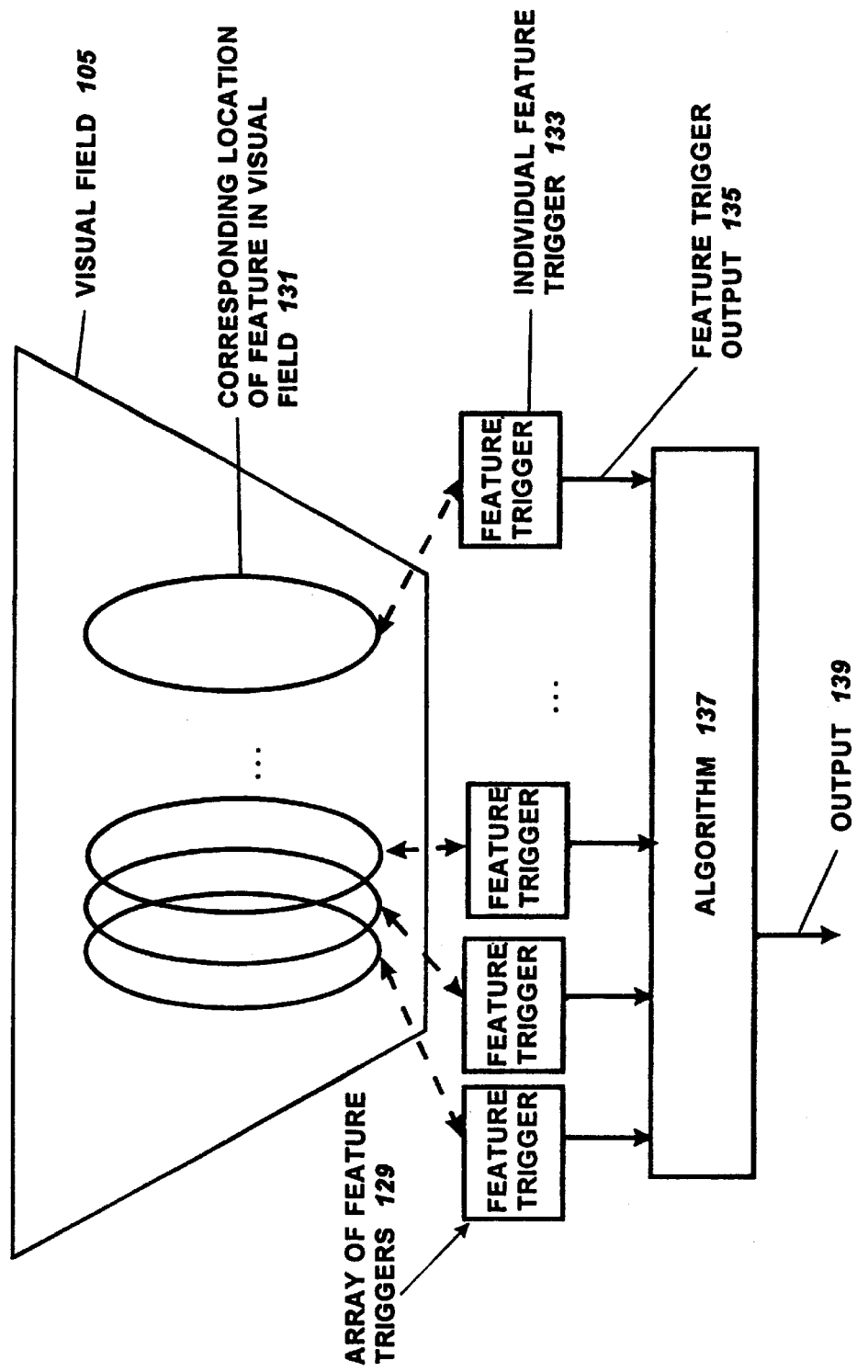
FIG. 3 shows the feature tracking method of optic flow measurement.

The sensor 99 (FIG. 5) described in this application is designed to extract the optic flow in one direction in one small section of a two-dimensional visual field. The sensor 99 of the invention has an orientation in the two-dimensional visual field. The output of the sensor 99 depends on both the optic flow and the sensor's orientation. FIG. 1 shows the sensor orientation vector 101, the optic flow vector 103, and the two-dimensional visual field 105 in which these vectors are located. Also shown is moving texture 107, the sensor region 109 in the visual field 105, the angle of incidence 111, and the projection vector 113. The visual field 105 represents the environment as experienced by the sensor 99. For the sake of discussion, the range of the visual field 105 can be formulated either as spanning azimuth and elevation angles from the sensor 99 to texture in the environment or as spanning the two-dimensional space on a camera focal plane. Both contexts are valid in the present invention. The sensor orientation vector 101 represents a direction in the visual field 105 in which the sensor 99 is oriented. The optic flow vector 103 represents the two-dimensional motion of texture 107 in the sensor region 109. For example, if the sensor region of the visual field 109 is occupied by a tree moving left at ten degrees per second, then the optic flow vector 103 will be pointed left and have a magnitude that represents ten degrees per second. The sensor's location in the visual field is defined as follows: suppose the sensor is part of an imaging device that includes a lens and a focal plane. If a tree in the environment is positioned so that it's image on the focal plane lands on the area in which the sensor is responsive, then it is said that the tree is at the sensor's location in the visual field.

The output of the sensor 99 is a measurement of the trigonometric projection of the optic flow vector 103 onto the sensor orientation vector 101. This vector is shown in FIG. 1 as the projection vector 113. The angle between the sensor orientation vector 101 and the optic flow vector 103 is called the angle of incidence. If the optic flow vector 103 is parallel to the sensor orientation vector 101, the sensor 99 will measure the true magnitude of the optic flow vector 103. Likewise if the sensor orientation vector 101 is pointed right and optic flow vector 103 points diagonally right and upward at 45 degrees at 10 degrees per second, then the sensor 99 will detect motion to the right at 10*cos(45 degrees)=7.07 degrees per second. The sensor 99 also reports a direction value, depending on whether the projection vector 113 is in the same direction or the opposite direction as the sensor orientation vector 101. The sign of the sensor output indicates whether the projection vector 113 is pointed in the same direction as the sensor orientation vector 101. If the projection vector 113 is in the same direction as the sensor orientation vector 101, the sign is positive. If these two vectors are pointed in opposite directions, the sign is negative. Alternatively a separate signal can be given that gives the direction.

The sensor 99 is robust against most artifacts in the image that might cause the sensor to mistakenly detect motion in the wrong direction. The sensor's performance is optimal when the sensor orientation vector 101 is parallel to the optic flow vector 103. The performance will degrade as the angle of incidence approaches 111 near 90 degrees. How close the angle of incidence 111 can approach 90 degrees is a function of the specific implementation. This shall be discussed in a future section.

The remainder of this specification discusses the present invention and it's operation. First, the primary structural elements of the invention will be discussed in a static description. Then, the operation of the sensor 99 will be discussed so that the reader can see how the invention works. Then, the two preferred embodiments of the invention will be discussed. The first embodiment is a hybridized version of the invention with low level processing performed on an ASIC chip and higher level processing performed on a digital computer. The second embodiment is a full analog version that can be implemented entirely on one chip. Lastly, a comprehensive version of the invention that includes other variations and additions will be discussed. For the sake of discussion, a sensor oriented so that it's orientation vector 101 is pointed in the +X direction (to the right) will be discussed.

Figure 4B:
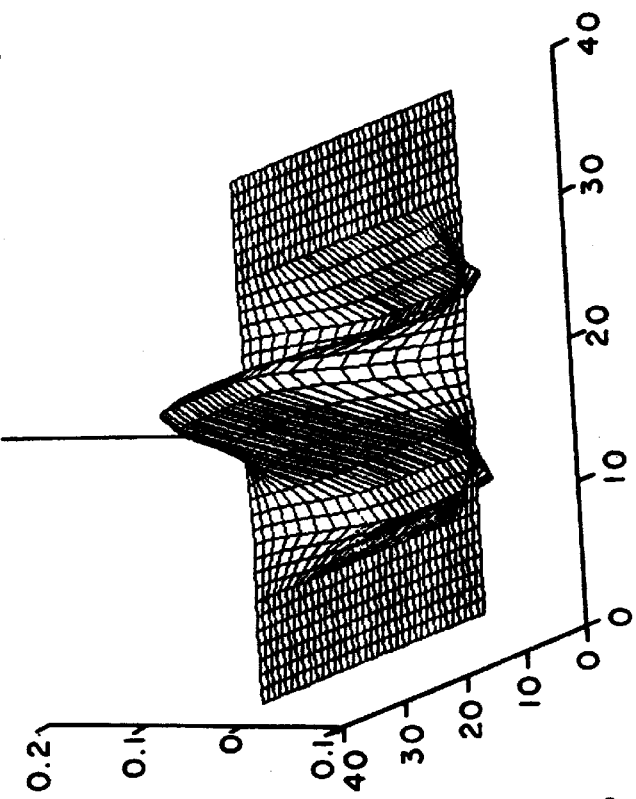
FIGS. 4a and 4b illustrate two feature detection kernels.
Figure 4A:
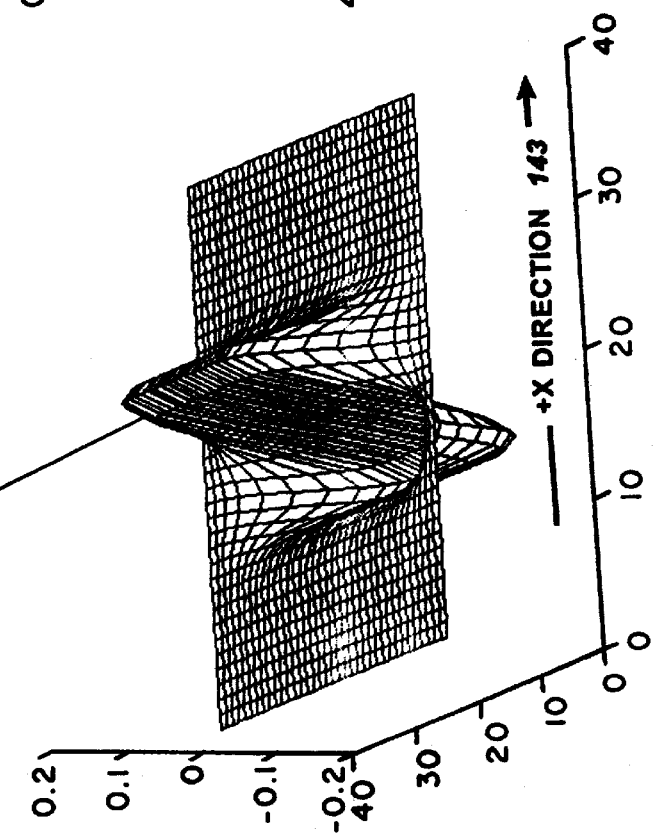

The sensor's operation will now be presented. It is essentially an improvement of the feature trigger method described with FIG. 4. This sensor 99 measures motion by tracking the movement of a feature across the focal plane and measuring the time required to move from one location to the next. A one-dimensional image is sampled using a linear photoreceptor array. Feature detectors operate on the photoreceptor outputs and generate feature signals. The determination of a feature's location is performed using a winner-take-all (WTA) circuit. The output of the WTA circuit can be interpreted as the "best estimate" of the location of the feature being tracked. Motion detection and speed measurement is performed by tracking the high WTA output in time using simple timing methods and simple logic to detect direction. All the structural elements from the feature detectors through the end can be implemented either in circuitry or as an algorithm on a computer.

This sensor 99 operates in one-dimension and therefore takes as an input a one-dimensional image. However by using the specialized linear photoreceptor array outlined in the above mentioned related patent application entitled "A Photoreceptor Array for Linear Optical Flow Measurement", this sensor 99 can be used in two-dimensional images. This is indeed what is described in the preferred embodiments of this invention. In this case this sensor measures the projection of the two-dimensional optical flow vector 103 onto the vector 101 representing the sensor's orientation. Thus, by placing several of these sensors in different orientations and using vector arithmetic, the two-dimensional optical flow vector can be determined.

Static Description of the Basic Structural Elements

Figure 5:
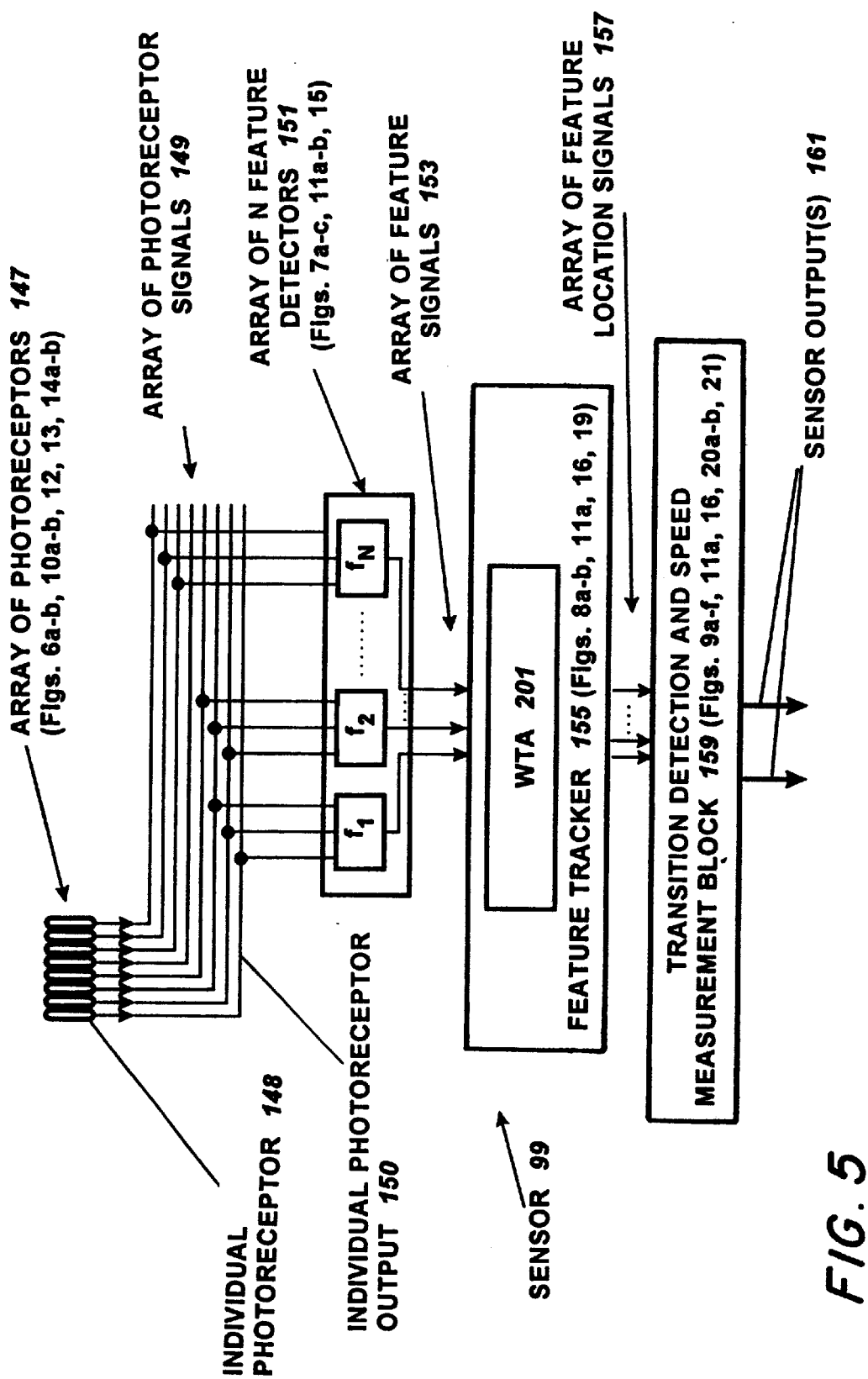
FIG. 5 shows the structural elements of a minimal version of the present invention.

The basic structural elements of the invention will be discussed by now referring to FIG. 5. FIG. 5 shows the different structural elements and how they are connected to form a minimal version of the invention. An array of P photoreceptors 147 generates an array of P photoreceptor signals 149 from the visual field 105 (FIG. 1). These photoreceptor signals form a one-dimensional image representation of the sensor's region 109 (FIG. 1) of the visual field 105. An array of N feature detectors 151 computes an array of N feature signals 153 from the photoreceptor signals 149. A feature tracker 155 computes one or more feature location signals 157 from the feature signals 153. The feature tracker 155 comprises a WTA circuit 201. A transition detection and speed measurement block 159 receives as input the feature location signals 157 and generates the sensor output 161. For ease of discussion, the structural elements of the sensor 99 shown in FIG. 5 are included with references to the other figures used to describe individual structural elements in greater detail. These references consist of figures used to describe the basic structure and operation of the sensor 99 as well as the first and second preferred embodiments. The structural elements of the sensor 99 will now be discussed in greater detail.

Figures 6A, 6B:
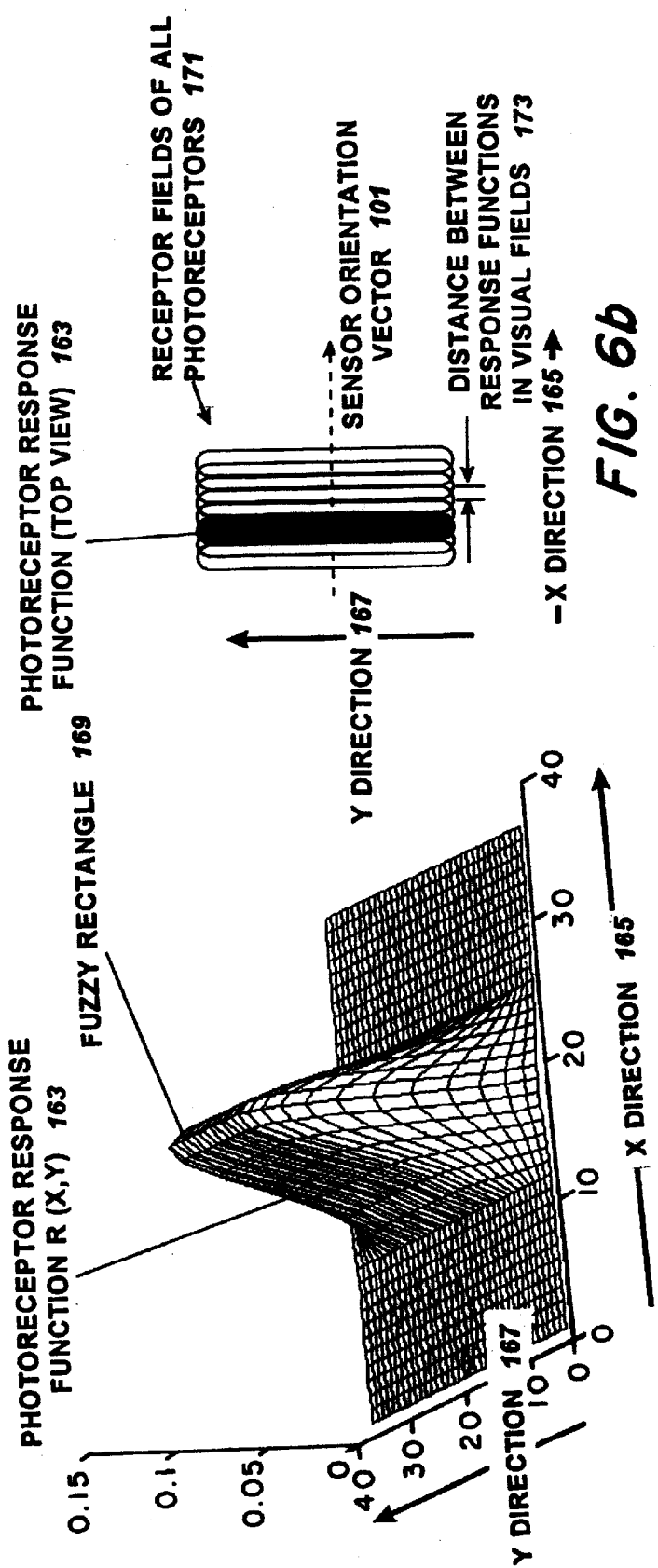
FIGS. 6a and 6b illustrate the desired shape of the photoreceptor fields and how they overlap in the photoreceptor array.

The purpose of the photoreceptor array 147 is to generate a meaningful one-dimensional image signal from the two-dimensional visual field 105. By "meaningful" it is meant that the photoreceptor array 147 preserves image information in one direction while filtering out information in the perpendicular direction. FIG. 6a shows the photoreceptor's receptor field function r(x,y) 163 as a function of X 165 and Y 167. The receptor field function 163 describes how much a photoreceptor 148 is stimulated by light from each specific location in the visual field 105. In this example, the receptor field function 163 is shaped like a blurry long rectangle 169. The reasons for using a blurry rectangle 169 will be made clear below. Also the means for implementing such a photoreceptor 148 will also be discussed in later sections. The rectangle is oriented lengthwise in the Y direction 167. The photoreceptor output 150 at time t is substantially p(t):

$$p(t) = \phi(\int\int r(x,y) I(x,y,t) dx dy)$$

where r(x,y) is the receptor field function 163 and I(x,y,t) represents the visual field 105 at time t. The function $\phi(\bullet)$ is a continuously differentiable monotonic function, preferably logarithmic or linear. Qualitatively, the double integral function inside of $\phi(\bullet)$ implements a weighted average of the intensity at the photoreceptor's location in the visual field 105 with the weighting function equal to r(x,y), while the function $\phi(\bullet)$ typically implements some sort of mapping inherent to the circuitry implementing the photoreceptor.

The photoreceptor array 147 comprises an array of these photoreceptors 148 placed side by side to form an array. FIG. 6b shows a top view of the receptor fields from all the photoreceptors 171 of the array. Note that the blurry rectangles 169 are placed along the array in the sensor orientation vector 101 but with the long axis in the Y direction 167. Note also that the receptor fields 171 are overlapping in the X direction 165. The receptor fields are separated by a distance d 173 in the visual field 105. One reason for using blurry photoreceptor field functions 163 that overlap is to avoid spatial aliasing of higher frequencies in the visual field 105. A second reason for using overlapping photoreceptor field functions 163 is to allow a tighter tracking of features in the visual field 105. In order for this invention to function properly, the photoreceptors in the array should be as identical as possible.

As stated above, an array of N feature detectors 151 generates an array of N feature signals $x_1$ through $X_N$ 153. The feature detectors 151 receive the photoreceptor signals 149 as input.

FIG. 7a shows a generalized feature detector 175. The feature detector 175 has M inputs 177 and one output 179. The output signal is determined by a feature function 181 on the M inputs 177. In order for the invention to function properly, the feature functions 181 of the feature detectors 151 need to be as identical as possible to each other. It is preferable, but not required, that the feature function 181 be a linear combination of the input signals.

FIG. 7b shows a linear feature detector 183, it's M inputs 185, and it's output 187 which is generated by a linear feature function 189. In this case, the coefficients $a_o$ through $a_M$ define the specific linear combination.

FIG. 7c shows an edge detector 191, which is one simple linear feature detector. In this example the left 195L and right 195R inputs are connected to a differential amplifier 197 while the middle 195M input is ignored. The differential amplifier 197 output forms the edge detector or feature output 199. This output 199 has an effective receptor field function like that of FIG. 4a. Thus, the edge detector's coefficients are $a_o=+1$, $a_1=0$, and $a_2=-1$.

As shown in FIG. 5, the N feature detectors 151 are connected so that the set of inputs connected to one feature detector 151 is the set of inputs connected to an adjacent feature detector 151 but shifted by one photoreceptor. The result of this connection scheme is that two adjacent feature detectors respond to the same feature shape in the image but shifted by the distance d 173 (FIG. 6b) in the visual field.

Note that it is possible to use the most trivial feature detector—a piece of wire connecting each photoreceptor signal to the corresponding feature signal. In this case the feature signals 153 are the photoreceptor signals 149. Thus, M=N. This case eliminates the need for feature detectors 151. In practice, though, this was found to not work well. This trivial feature detector is considered within the scope of the present invention.

As shown in FIG. 8a, the N feature signals 153 provide input to a feature tracker 155 to generate N feature location signals 157. In the most basic form, the feature tracker 155 consists of a winner-take-all (WTA) 201. FIG. 8a shows a four input wide version of the WTA 201 inside the feature tracker 155. A four input and four output version of the WTA 201 is shown in FIG. 8a.

FIG. 8b is used to describe the operation of the WTA. FIG. 8b shows four input waveforms (203, 205, 207, and 209) to the WTA 201 and four output waveforms (211, 213, 215, and 217) generated by the WTA 201. The input signals 203, 205, 207, and 209 are analog and the output signals 211, 213, 215, 217 are digital.

The WTA 201 operates as follows: first the feature signal 153 with the highest value is determined. Then the feature location signal 157 corresponding to the highest input line is set to a digital high while the other feature location signals 157 are set to a digital low. A circuit for implementing the WTA 201 is discussed in a later section. A later section also discusses variants of the WTA 201.

As stated above, the N feature location signals 157 are then applied to the transition detection and speed measurement block 159 (FIG. 5). Transitions between adjacent feature location signals are detected, and the time between these transitions is used to generate a direction and speed measurement. As shown in FIG. 5, the transition detection and speed measurement block 159 takes as input the feature location signals 157 and generates a speed and direction measurement.

Figure 9A:
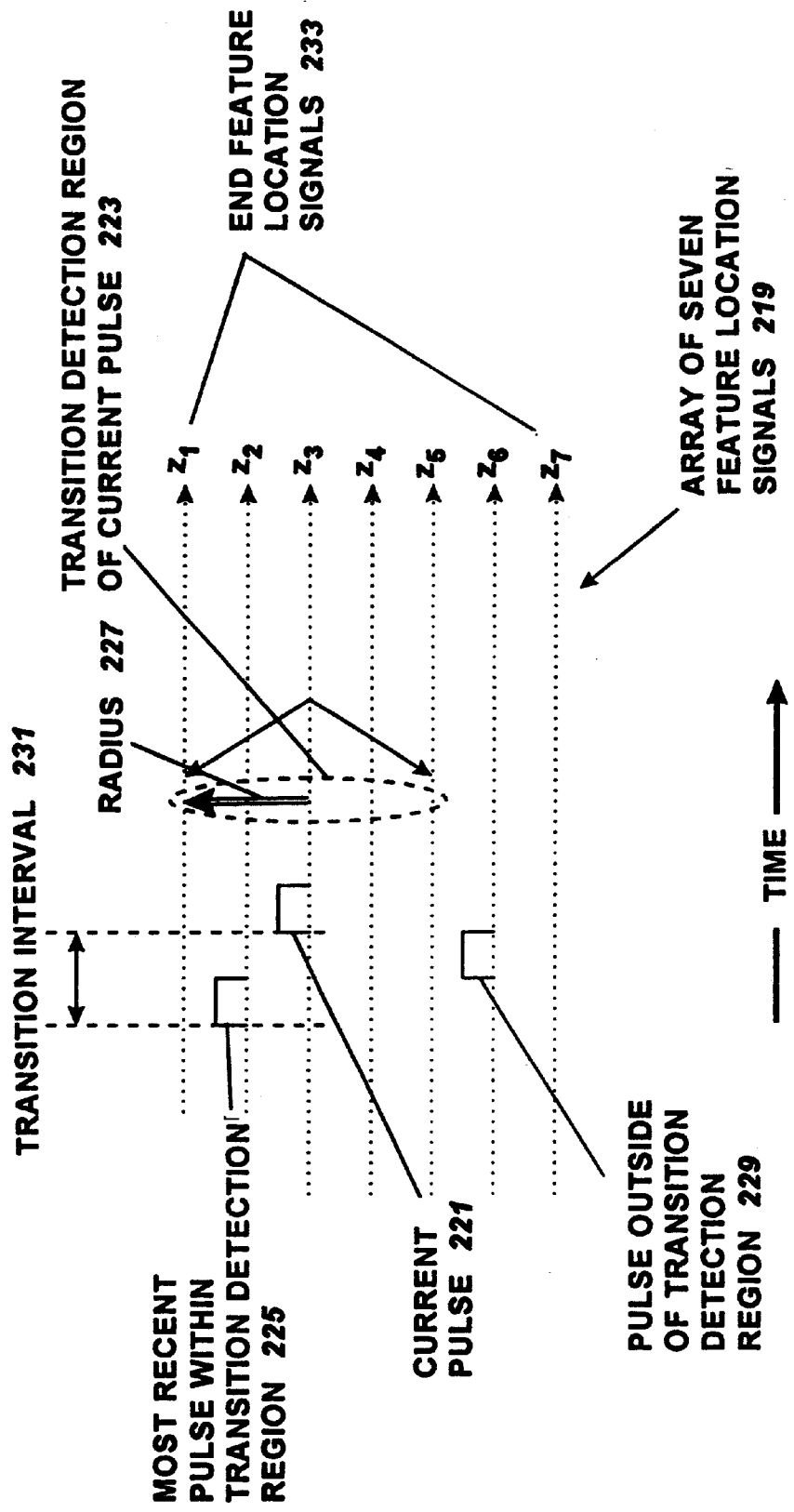

FIGS. 9a through 9e are used to describe what type of transitions will generate a measurement and what type will not. FIG. 9a shows an array of seven feature location signals 219. Shown also are the current pulse 221, the transition detection region of the current pulse 223, the most recent pulse within the transition detection region 225, a radius 227, a pulse occurring outside the transition detection region 229, a transition time interval 231, and the two end feature location signals 233. In this application and for definition, it is said that a transition occurs between two pulses (or just between two feature location signals) when 1) the first pulse occurs sometime before the second pulse, 2) the first pulse lies within the transition detection region of the second pulse and 3) the first pulse is the most recent occurring pulse within the second pulse's transition detection region. A transition is called valid when 1) the two pulses are on adjacent feature location signals 219, and 2) neither of the pulses occurs on an end feature location signal 233.

For the purpose of discussion and clarification, assume that the current pulse 221 has just appeared. Associated with the current pulse 221 is the transition detection region 225 of a specified radius 227. In the case of this example, the radius is two feature location signal lines. The transition detection and speed measurement block 159 (FIG. 5) (also called the block 159) recalls the most recent pulse 225 within the transition detection region 223. The block 159 (FIG. 5) notices that the most recent pulse 225 and the current pulse 221 are on adjacent feature location lines. Hence the block 159 (FIG. 5) registers a valid transition between the lines containing two feature location signals 157, with the transition time interval 231. This time interval 231 is the interval between the rising edges of the current pulse 221 and the most recent pulse 225 in the transition detection region 223. The time interval 231 and the distance d between receptor field functions 173 can be used to compute a speed measurement. Note that because d is known, if the block 159 (FIG. 5) outputs just the time interval 231 instead of a speed measurement, just as much information is given. Hence, for this patent application a speed measurement output is considered equivalent to giving the time interval as an output. A direction measurement is determined by which direction on the feature location array the pulse is moving. In the example given here, a positive direction would be registered.

Note that any pulse occurring outside the transition detection region 159 will have no affect on the detection of a valid transition. Thus if the pulse 229 (FIG. 9a) occurred on feature location line Z7 rather than feature location line Z6, the block's 159 (FIG. 5) response would be the same. However, there are transitions that are not valid. These will be detected by the block but will generate no measurement. A transition is considered invalid when the two pulses associated with a transition are not on adjacent feature location lines 219. A transition is also considered invalid when either the current pulse or the most recent pulse occurs on one of the end feature location signals. FIGS. 9b through 9e will clarify these rules through examples.

FIG. 9b shows a transition from line Z6 to line Z4 involving pulse 235 and pulse 237. Pulse 235 lies within the transition detection region 239 of pulse 237. Therefore a transition is detected between the pulses 239 and 237 (or equivalently between lines Z6 and Z4). However the transition is not valid. Therefore no output will be given.

FIG. 9c shows a transition between line Z5 and line Z4 involving pulse 241 and pulse 243. Pulse 241 lies within the transition detection region 245 of pulse 243 and these two pulses 241 and 243 are adjacent. Therefore the transition is valid and an output will be generated using the time interval 246 to measure speed.

FIG. 9d shows a sequence of three pulses: pulse 247, pulse 249, and pulse 251. The first two pulses 247 and 249 are within the transition region 253 of pulse 251. Note that a valid transition had occurred from line Z5 to line Z6 involving pulse 247 and pulse 249 because they are adjacent. However the occurrence of pulse 249 prevents a transition from being registered involving pulse 247 and pulse 251. Therefore no measurement will be given as an output. Note that if pulse 249 was outside the transition detection region 253 then a valid transition would be detected involving pulse 247 to pulse 251. This is essentially the same scenario as depicted in FIG. 9a.

FIG. 9e shows a transition from Z1 to Z2 involving pulse 255 and pulse 257. Pulse 255 lies within the transition detection region 259 of pulse 257. However, this transition is invalid because pulse 255 occurred on an end feature location signal 233. Thus, no output will be given.

A simplification of the above rules for valid and invalid transitions can be made by setting the transition detection radius to infinity. Thus all transition detection regions encompass the entire feature location signal array. In this case, any two sequential pulses will be registered as a transition. However the transition will be registered as invalid if and only if 1) the two pulses occur on adjacent feature location signals and 2) neither of the two pulses occurred on an end feature location line. For example, for N=5 these transitions are valid: {2→3, 3→4, 4→3, 3→2} while these transitions are invalid: {1→2 (from an end-line), 4→5 (to an end-line), 2→4 (not adjacent)}.

Description of the Operation of the Invention

It will now be discussed as to how the above structural elements cooperate to measure the optic flow. For the purposes of discussion, let P=6 and N=4. Thus there are six photoreceptors 147 (FIG. 5) and photoreceptor signals 149 (FIG. 5), and there are four feature detectors 151 (FIG. 5), feature signals 153 (FIG. 5), and feature location signals 157 (FIG. 5). Also let the feature detectors 151 (FIG. 5) be the edge detectors 191 shown in FIG. 7c. Finally, let the radius 227 (FIG. 9a) associated with the block 159 (FIG. 5) be infinity, with the implications as discussed above. Due to the blurry rectangle 169 (FIG. 6a) shape of the photoreceptor's receptor field function 163 (FIG. 6a), the differential amplifier 197 will implement a first derivative detector 141 like that shown in FIG. 4a. Hence when a vertical edge with the right-hand side brighter is in the visual field 105 (FIG. 1) so that the edge is located between the receptor fields of the photoreceptors that connect to the differential amplifier 197, the differential amplifier 197 will have a high signal at the feature output 199. As this edge enters the sensor's region 109 (FIG. 1) in the visual field 105 (FIG. 1), the left-most feature signal will rise to a higher value than the other feature signals 153. Thus, due to the WTA 201 in the feature tracker 155 (FIG. 8a), the left-most feature location signal will be high while the other feature location signals 157 will be low. As the edge moves across the sensor's region 109 in the visual field 105 (FIG. 1). the second left-most feature signal will become the maximum, then the third left-most, and so forth until the edge exits the sensor's region 109. Thus the second left-most feature location signal will be the high one. then the third left-most, and so forth through all the feature location signals. All resulting transitions in the feature location signals 157 (FIG. 8) will be valid. with the exception of the transitions involving the end feature location signals 233 (FIG. 9a). At each valid transition, the transition detection and speed measurement block 159 will register motion to the right, with the appropriate speed computed by how long each feature location signal 157 remains high. Thus the sensor 99 will create outputs 161 only whenever valid transitions occur. At other times, the sensor does not create an output.

Texture in the real world typically does not consist of simple edges. However, within a given visual field 105 (FIG. 1) there will be some texture entities that look more like edges than others. These texture entities will be those that have the highest spatial intensity derivative in the +X direction. When confronted with real moving texture, the feature tracker 155 (FIG. 5) in this sensor 99 will track the movement of these texture entities, thus generating valid transitions and speed and direction measurements 161. Note that in this discussion only the first derivative detector 141 was considered for a feature detector 151. When other types of feature detectors 151 are used, the feature tracker 155 will track texture entities in the visual field 105 that are most like the patterns generated by the feature function 181 (FIG. 7b) and the blurry rectangle 169 (FIG. 6a).

The rules by which the transition detection and speed measurement block 159 (FIG. 5) judges a transition to be valid were discovered partially through theory and partially through experimentation. Invalidating transitions that are not between feature location signals 157 that are adjacent is an intuitive rule that should be clear to those well versed in the art. Invalidating transitions that involve end feature location signal lines 233 (FIG. 9a) helps to prevent false transitions in the opposite direction that may occur as a texture entity salient to the feature function 181 moves out of the sensor region 109 occupied by the sensor 99 and leaves the adjacent feature location signal with the highest value. Using a small radius 227 (FIG. 9a) to generate transition detection regions allows multiple texture entities to be tracked in one sensor.

In relation to FIG. 1, the situation when the angle of incidence 111 between the optic flow vector 103 and the sensor orientation 101 vector varies will now be discussed. Here it will be discussed why speed measured by the sensor 99 is the magnitude of the projection vector 113 when the photoreceptor receptor fields 163 (FIG. 6a) are rectangular shaped. To do this, it will be considered what any one-dimensional optic flow algorithm would detect when using such a photoreceptor array 147 (FIG. 5).

Figure 10:
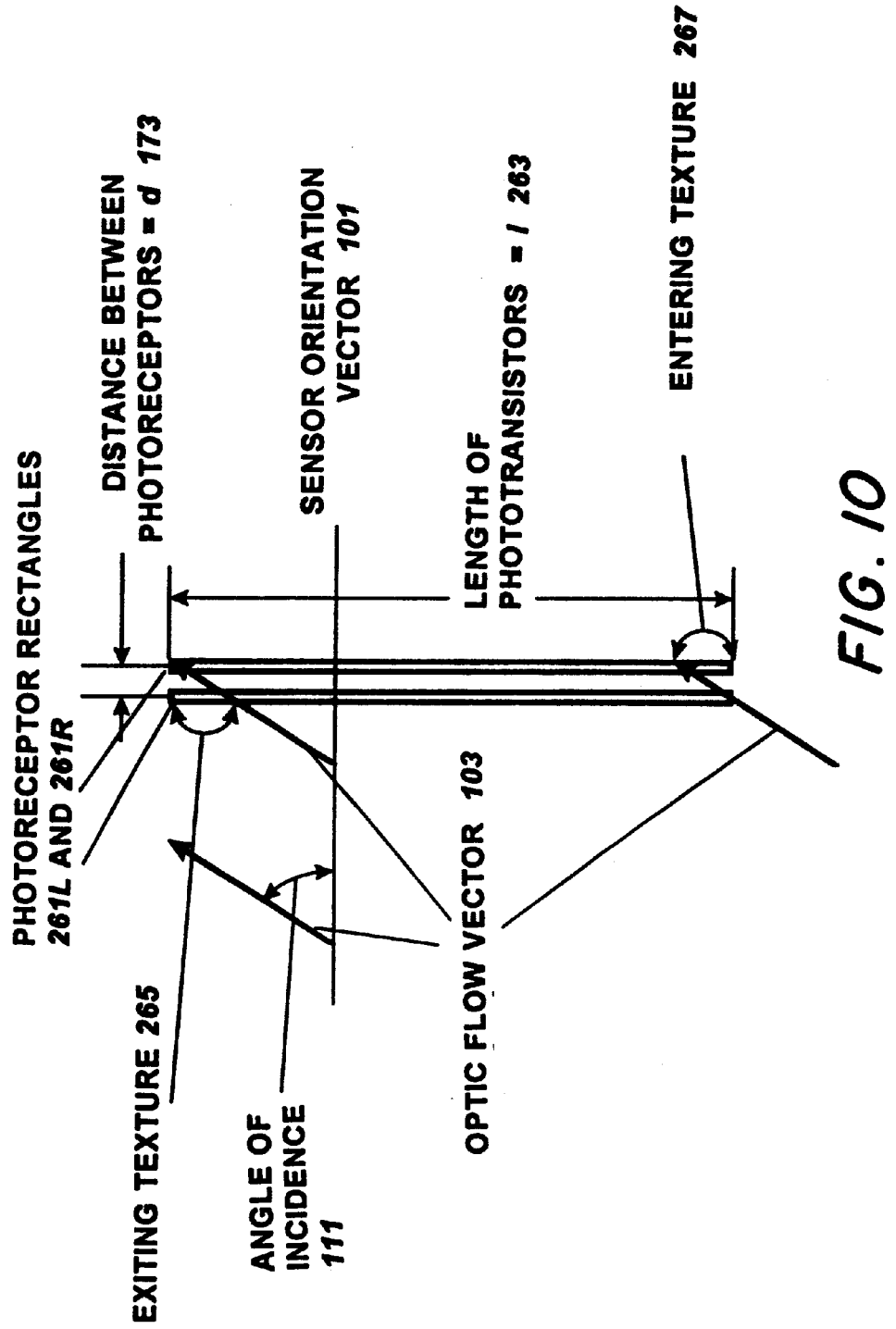
FIG. 10 shows how the linear photoreceptor array allows the projection of the 2-D optic flow vector onto the sensor orientation to be computed.

FIG. 10 shows a top view of an array of two photoreceptors, 261L and 261R, whose receptor field functions 163 are perfectly rectangular. For discussion, these two photoreceptors 261L and 261R are part of a larger photoreceptor array. Also shown is the sensor orientation vector 101 (from FIG. 1), the optic flow vector 103 (from FIG. 1), the distance d 173 (from FIG. 6b) between the receptor field functions 163 (FIG. 6b) in the visual field 105 (FIG. 1), the length l 263 of the photoreceptors in the visual field 105 (FIG. 1), where exiting texture 265 crosses the left photoreceptor, and entering texture 267 crosses the right photoreceptor. Let q denote the angle of incidence 111. Let v be the magnitude of the optic flow vector 103.

Assume θ=0 degrees, so that the texture motion is parallel to the orientation vector 101. In this case, the outputs of photoreceptors 261L and 261R will be merely time delayed versions of each other with the time delay equal to $$\Delta t = \frac{d}{v}.$$

This same result applies to all photoreceptors in the array 147 (FIG. 5). This set of signals will appear simply as one-dimensional motion and hence is easy for optic flow computation, as described in the background art section.

Now suppose θ had a non-zero value. In this case the distance traveled by the texture when moving between the photoreceptors 261L and 261R is d/cosθ. Thus by simple division the time required to move from one photoreceptor to another is $$\Delta t = \frac{d}{v\cos\theta}.$$

Thus the outputs of photoreceptors 261L and 261R are approximately delayed versions of each other with this longer delay. Using simple geometry. it can be seen that the speed seen by an optic flow algorithm is $$\hat{v} = v \cos\theta$$

This is the magnitude of the projection of the optic flow vector onto the array orientation.

Note, however, that exiting texture 265 appears at photoreceptor 261L but not at photoreceptor 261R. Note also that entering texture 267 appears at photoreceptor 261R but not at photoreceptor 261L. Because of these exiting 265 and entering 267 textures, the sum of the texture arriving at photoreceptors 261L and 261R will be slightly different. The net result is that the outputs of adjacent photoreceptors are not exactly delayed versions of each other. Typically the exiting texture 265 and entering texture 267 are uncorrelated, therefore they appear as additive noise to the photoreceptor signals. The power of this noise is proportional to $^{tan\theta}$. If θ is not near 90 degrees and if the photoreceptors are very long, then the magnitude of this noise is small compared to the photoreceptor signal. Therefore an optic flow algorithm using the photoreceptor array 147 will compute an accurate measurement of the projection vector 113 (FIG. 1). The accuracy of this projection vector 113 can be increased for high angles of incidence by increasing the ratio of the photoreceptor length l 263 to the photoreceptor separation distance d 173.

DETAILED DESCRIPTION OF THE FIRST PREFERRED EMBODIMENT

Figure 11:
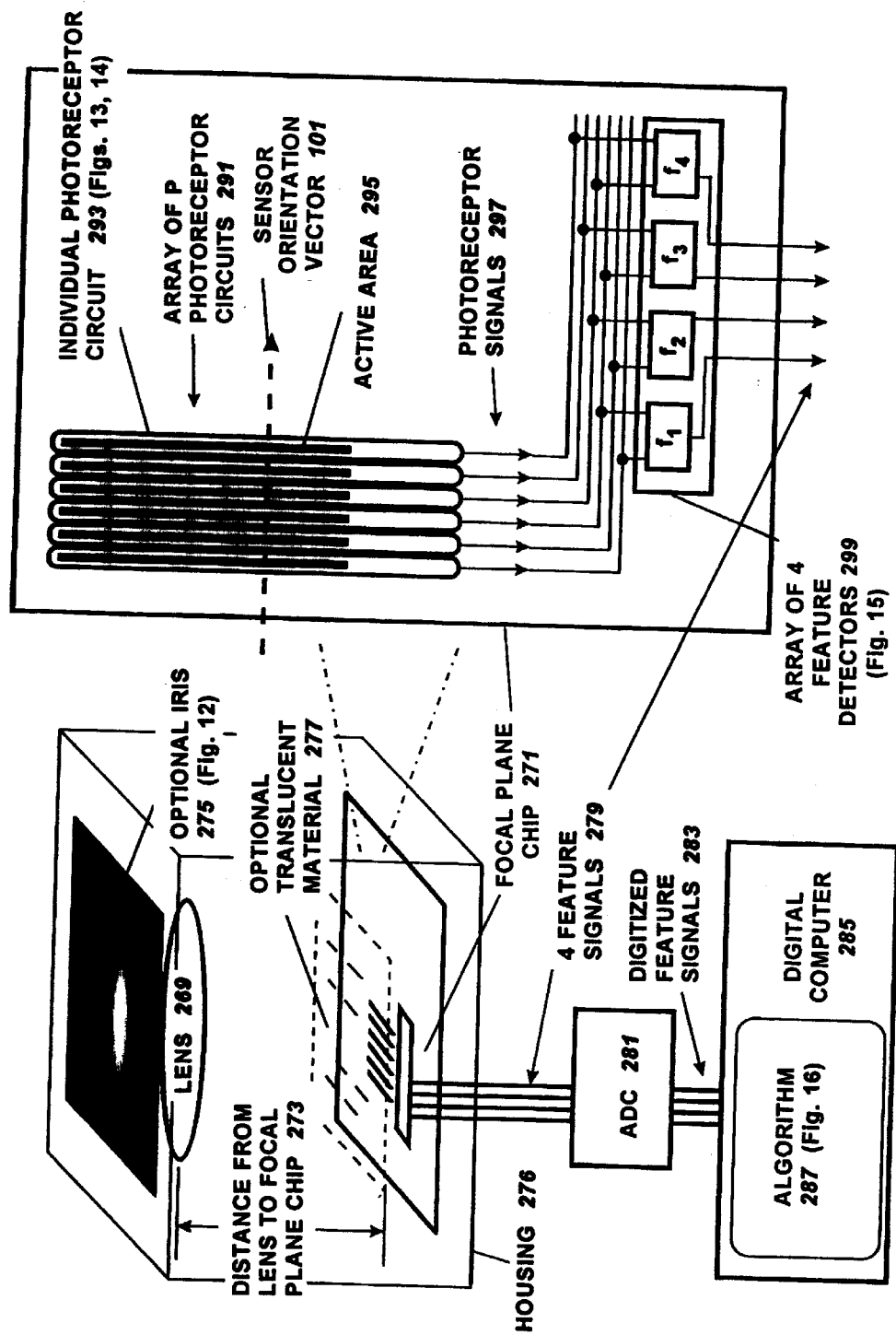
FIGS. 11a and 11b show the structural elements of the first preferred embodiment.

FIG. 11a shows the main structural elements of the first preferred embodiment of this invention. This embodiment is selected as the first preferred embodiment because it has been implemented and tested, it is easy to fabricate and implement, and in the opinion of the applicant it anticipates the growing technological trend toward single chip systems involving embedded microcontrollers. A lens 269 focuses light from the visual field 105 onto a focal plane chip 271. The distance 273 between the lens 269 and the focal plane chip 271 is set so that the image formed on the focal plane chip 271 is slightly out of focus. An optional iris 275 can be placed on top of the lens 269, as shown in FIG. 11a, or between the lens and the focal plane chip 271. A layer of optional translucent material 277 can be placed between the lens 269 and the focal plane chip 271, near the focal plane chip 271. A housing 276 provides physical support for the lens 269, the iris 275, the translucent material 277, and the focal plane chip 271 and ensures that the only light striking the focal plane chip 271 is through the lens 239 and/or the iris 275. The contents of the focal plane chip 271 will be discussed shortly. Coming off the chip 271 are four feature signals 279. These feature signals 279 are then digitized by an analog to digital converter 281 to generate digitized versions of the feature signals 283. The digitized feature signals 283 are then applied to a digital computer 285. The digital computer 285 contains in it's memory a program that implements an algorithm 287 (FIG. 11a). The algorithm 287 implements offset cancellation, noise filtering, feature tracking, transition detection, and speed measurement. By running the algorithm 287, the digital computer 285 provides the sensor output 289. It should be noted that in the first preferred embodiment, time is discretized by the algorithm 287 running on the computer 285.

FIG. 11b shows the contents of the focal plane chip 271. An array of P=6 photoreceptor circuits 291 is arranged in the manner described above and shown in FIG. 6b. Each photoreceptor circuit 293 has an active area 295 which responds to light striking the focal plane chip 271. The photoreceptor circuits 291 output an array of photoreceptor signals 297. An array of four feature detectors 299 receives input from the photoreceptor signals 297. These feature detectors 299 generate the four feature signals 279 which are sent off-chip.

Included in both FIGS. 11a and 11b are references to other figures used to describe the individual structural elements. These structural elements will now be considered in more detail:

First consider the photoreceptor array 291. FIG. 11a depicts the placement of the different optical components, which are the lens 269, the optional iris 275, the optional translucent material 277. and the focal plane chip 271. Much like in a camera, the lens 269 focuses an image of the visual field 105 onto the focal plane chip 271. Unlike a camera, the distance 273 between the lens 269 and the focal plane chip 271 is set so that the image is slightly blurred. The lens 269 can be any type of convex lens. However the lens 269 should have a focal length on the order of between less than a millimeter and several centimeters, depending on the physical geometry of the photoreceptor array 291 and on the desired shape of the sensor's region 109 in the visual field 105.

Figure 12:
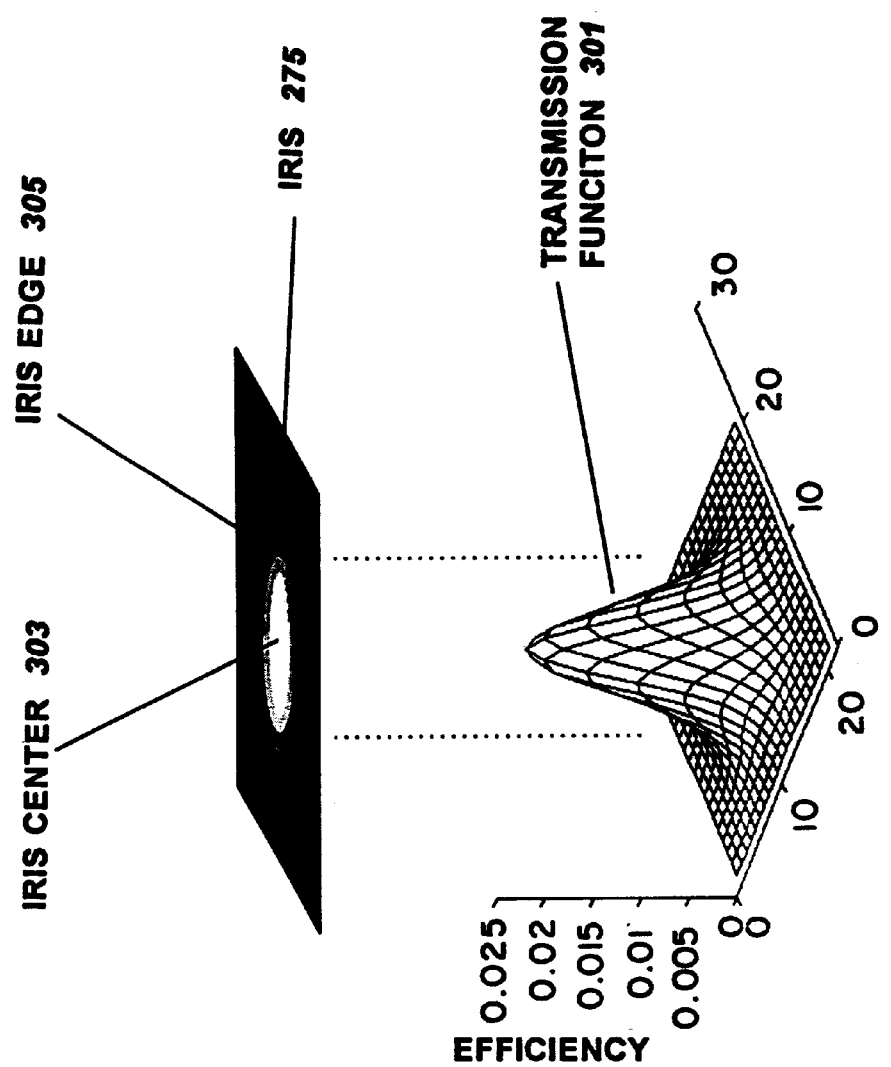
FIG. 12 shows the transmission efficiency of the iris.

The iris 275 is located either before the lens 269 or between the lens 269 and the focal plane chip 271. FIG. 12 shows the iris 275 and it's transmission function 301. The transmission function 301 represents the efficiency with which light passes through different parts of the iris 275. This iris 275 can be made with a graded shading, which means that the efficiency function ranges from 0% to 100% efficiency, including values in between. This is different from an iris found in a conventional camera, where light is either totally passed or totally stopped. Note though that a conventional iris can be used, but the blurring would be more difficult to control. The shape of the transmission function 301 should mimic the shape of a simple two-dimensional low-pass filter, as shown in FIG. 12. Thus, light is transmitted with full efficiency at the iris center 303 and with decreasing efficiency towards the iris edge 305.

Perhaps the simplest method of constructing iris 275 is using photographic film: A camera can be used to take a picture of a "blurry white circle" onto either a slide or a negative, then this picture can be cut out and used for the iris 275. More specifically, first a circle can be cut out from white paper and then placed onto a very black surface, such as black fabric or construction paper. Next, using a camera loaded with slide film, a picture of the white circle on the black fabric can be taken with the camera out of focus, thus blurring the image of the circle. It should be ensured that the circle is cleanly inside the boundary of the picture. Develop the film. Use the resulting slide as the iris 275, with the white circle part of the picture as an iris opening. Care must be taken to ensure that the resulting iris 275 matches the size of the lens 269.

Figure 13:
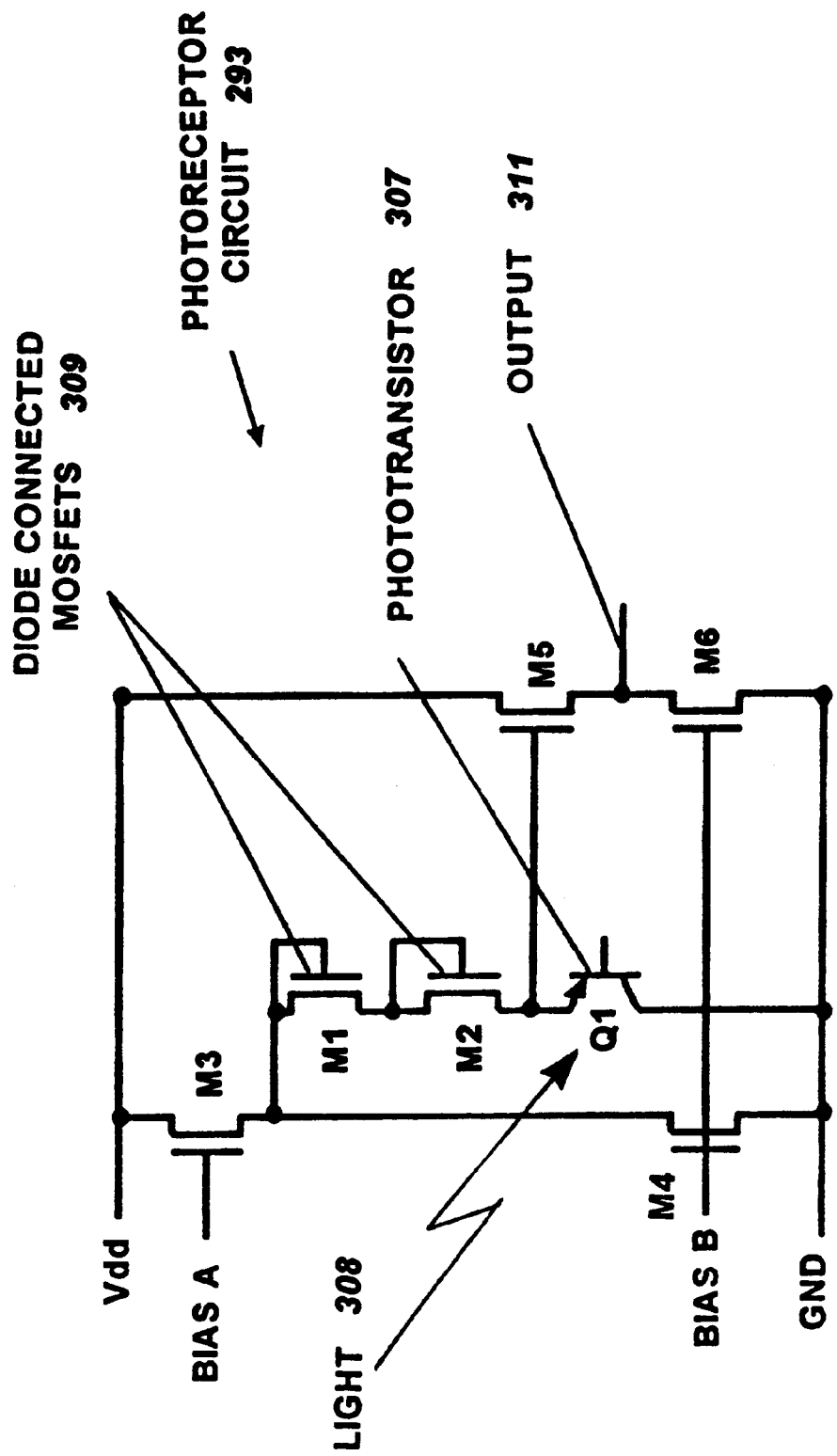
FIG. 13 shows the photoreceptor circuitry.

FIG. 13 shows the schematic diagram of an individual photoreceptor circuit 293. The main component is the phototransistor Q1 307. The amount of current flowing through the phototransistor 307 is proportional to the light 308 striking it. The diode-connected metal-oxide-semiconductor field-effect transistors (MOSFETs) 309 transduce the phototransistor 307 current to a voltage signal, which is given as the photoreceptor output 311. The diode connected MOSFETs 309 are relatively wide, thus they are biased in the subthreshold region. Thus, the voltage drop across them is a logarithmic function of the light 308 intensity striking the phototransistor 307. This technique of building a photoreceptor circuit is adapted from the contents of the book *Analog VLSI and Neural Systems*, by Carver Mead.

Figure 14:
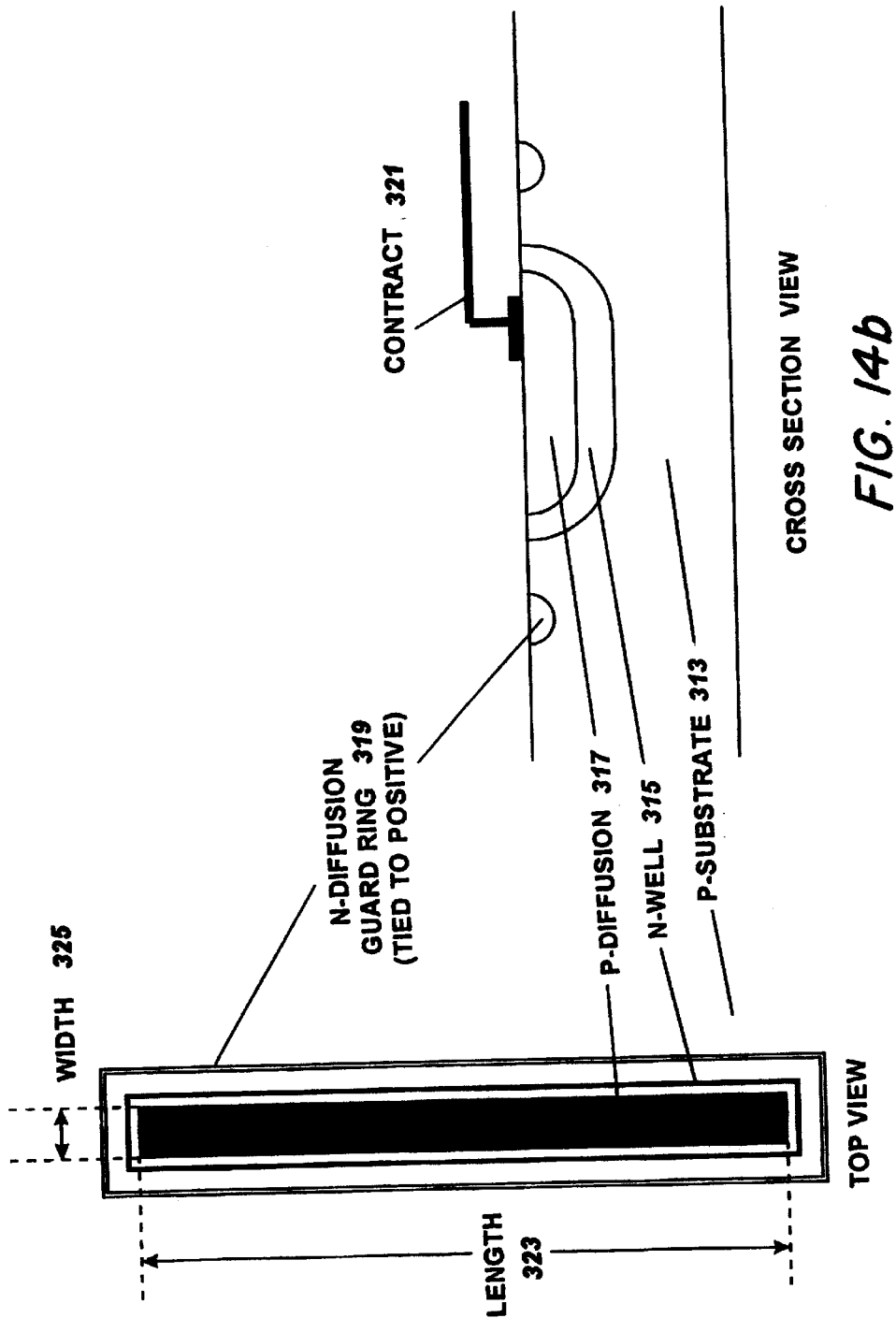
FIG. 14a and 14b show the vertical parasitic PNP phototransistor, with FIG. 14a showing a top view and FIG. 14b showing a cut-through view.

FIGS. 14a and 14b show respectively a top view and a cross-section view of the preferred way of implementing the phototransistor 307 (FIG. 13), which is implemented on the focal plane chip 271 (FIG. 11b). The phototransistor 307 (FIG. 11b) itself forms the photoreceptor circuit's active area 295. Shown is a P-substrate 313, an N-well 315, P-diffusion 317, a guard ring 319, a contact 321, and the phototransistor's length 323 and width 325. This is actually a parasitic vertical PNP transistor that is a byproduct of any N-well complementary metal-oxide-semiconductor integrated circuit fabrication process. When light strikes the phototransistor 307 (FIG. 13), electron-hole pairs form in the region between the N-well 315 and the P-diffusion 317. This allows current to flow from the contact 321 to the P-substrate 313, which forms the phototransistor's 307 (FIG. 13) collector. The P-diffusion 317 forms the phototransistor's 307 (FIG. 13) emitter. The P-diffusion 317 is connected via the contact 321 to the diode connected MOSFETs 309, as shown in FIG. 13. An N-diffusion guard ring 319 circles the phototransistor 307 (FIG. 13) to provide electrical isolation from other components on the focal plane chip 271 (FIG. 11b) . This guard ring 319 is tied to a positive voltage. This method of creating a phototransistor 307 is also adapted from *Analog VLSI and Neural Systems*. Of special significance are the phototransistor's length 323 and width 325 dimensions. The length 323 is significantly longer than the width 325 so that a rectangular photoreceptor receptor field is generated.

The photoreceptor circuits 291 (FIG. 11b) act together with the lens 269, the iris 275, 49 and the focal plane chip 271 (FIG. 11a) to implement photoreceptors 147 (FIG. 5) with overlapping receptor fields 171, as shown in FIG. 6b. It can be seen that the active areas 295 of the photoreceptor circuit array 291 (FIG. 11b) are rectangular and not overlapping. However because the focal plane chip 271 is placed slightly out of focus with respect to the lens 269 (FIG. 11a), the image on the focal plane chip 271 is blurred. This blurring effect is called optical smoothing. The net result is that a photoreceptor's receptor field function 163 (FIG. 6b) in the visual field 105 (FIG. 1) is a result of 1) the phototransistor's dimensions 323 and 325 (FIG. 14a), 2) the distance 273 between the lens 269 and the focal plane chip 271 (FIG. 11a), 3) the amount by which the image on the focal plane chip 271 (FIG. 11a) is out of focus, and 4) the shape of the iris transmission function 301 (FIG. 12). Equivalently, it can be said that the receptor field function r(x,y) 163 (FIG. 6b) is obtained by convolving the rectangular shape of a phototransistor 307 (FIG. 13) with a smoothing function. The smoothing function would be essentially a shrunk-down version of the iris transmission function 301 (FIG. 12). Thus the iris transmission function 301 shape shown in FIG. 12 can be used to depict a smoothing function, except the smoothing function is smaller in size. By controlling these different parameters, and hence the optical smoothing. it is possible to make the photoreceptor receptor field functions 163 (FIG. 6b) overlap. A second benefit of the optical smoothing is that higher spatial frequency components of the image are reduced. This helps to prevent spatial aliasing of higher spatial frequency components of the image on the focal plane 271 (FIG. 11a). This technique is analogous to that of low-pass filtering an analog signal before digitizing it for digital signal processing to eliminate spectral components above the Nyquist frequency.

Figure 15:
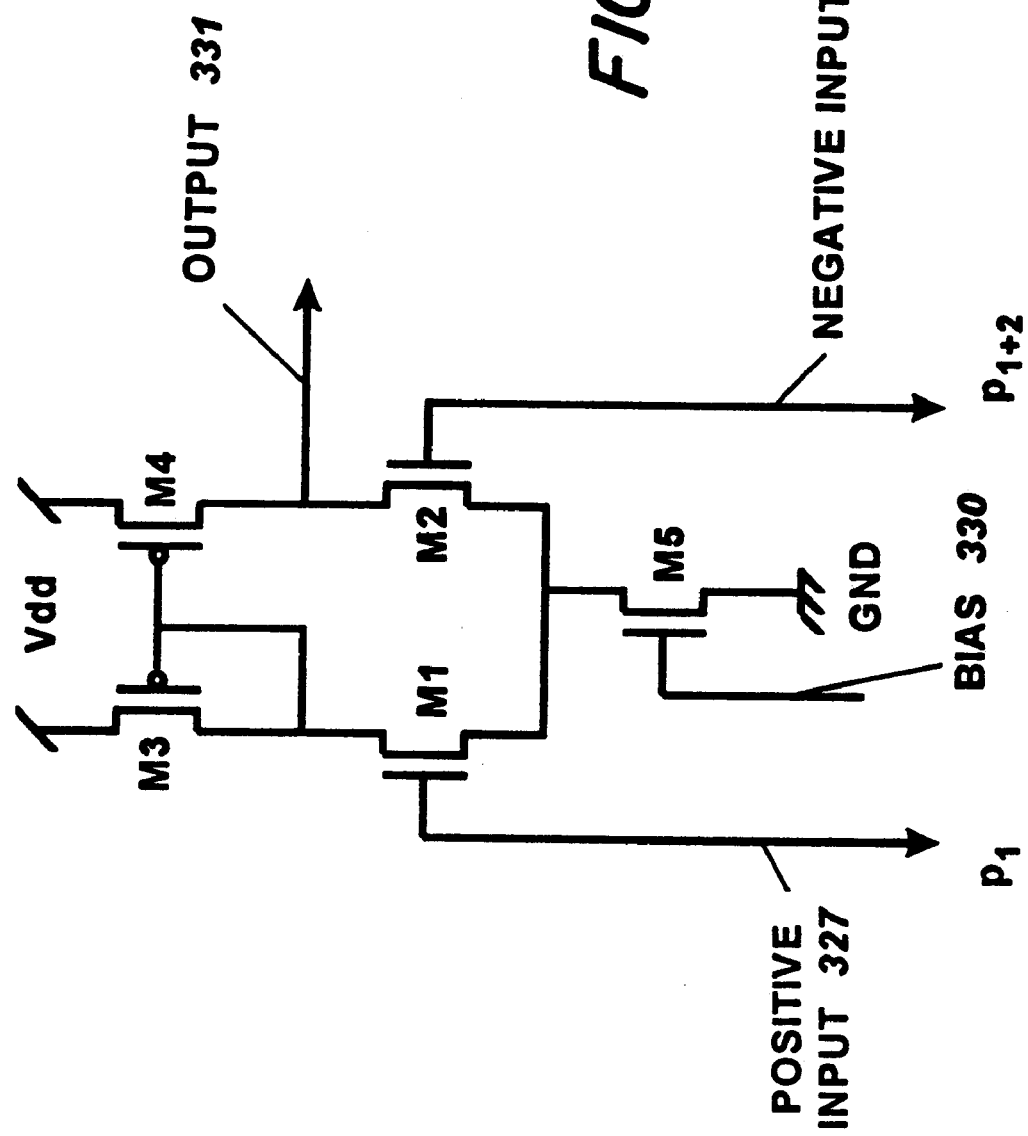
FIG. 15 shows a simple differential amplifier.

Next, the feature detectors 299 will be considered. Each feature detector 299 (FIG. 11a) can be implemented by a simple differential amplifier 197, as shown in FIG. 7c. FIG. 15 shows a circuit realization of the differential amplifier 197 (FIG. 7c). The positive input 327 and negative input 329 of the differential amplifier 197 (FIG. 7c) connect to the two appropriate photoreceptor signals 193 (FIG. 7c). The bias voltage 330 is used to set the current level through the circuit and adjusts the amplifiers output resistance. The differential amplifier output 331 becomes the feature signal $x_i$. The differential amplifier circuit shown in FIG. 15 tends to have a gain on the order of 10 through 100 or more, depending on the fabrication process and on the transistor geometries.

The feature signals 279 are then sent off the photoreceptor chip to be digitized by an analog to digital converter (ADC) 281 (FIG. 11a). The digitized feature signals are then applied to a digital computer 285 (FIG. 11a). The digital computer 285 implements an algorithm which implements the feature tracker, the transition detection and speed measurement block. as well as simple offset and noise cancellation functions. This algorithm will be discussed shortly. The physical nature of the digital computer 285 and the ADC 281 will depend on the specific application and the specific technologies available at the time an implementation of this invention is made. At the time of this writing, a microcontroller board with an on-board ADC would suffice. Many of the Motorola 68HC11-based microcontroller boards would suffice. In this case the digital computer 285 would have memory to store the program and the variables that implement the algorithm, and would control when and how often the ADC 281 would sample the feature signals. Other possibilities for implementing the digital computer 285 would be 1) a single chip microcontroller that includes an on-chip ADC, and 2) a single chip including hardwired digital circuitry and an ADC, such that the digital circuitry implements the algorithm. Note that in these two cases the photoreceptor circuit array and feature detectors could conceivably be implemented on the same chip. All of these variations are to be considered within the scope of the first preferred embodiment.

Figure 16:
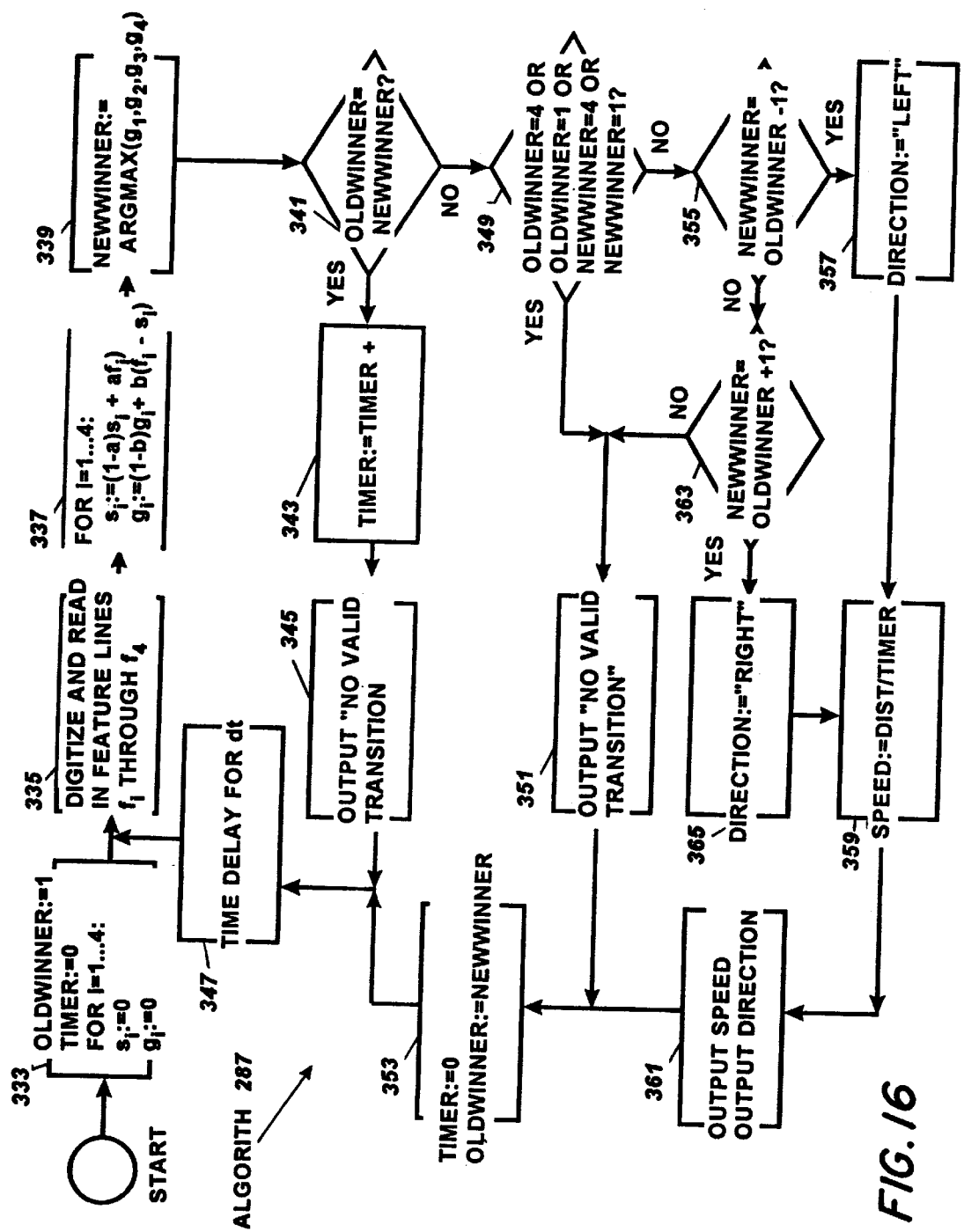
FIG. 16 illustrates the algorithm for the first preferred embodiment that implements filtering for noise and offset cancellation, transition detection, and speed measurement.

FIG. 16 shows a flow-chart for the algorithm 287 (FIG. 11a) that implements the feature tracker 155 and the transition detection and speed measurement block 159 of FIG. 5. This algorithm 287 also includes steps that perform simple high-pass and low-pass filtering on the digitized feature signals 283 (FIG. 11a). This filtering will be discussed below. This algorithm 287 can be implemented in any computer language appropriate for the computer 285 on which it runs. The algorithm 287 is presented in the following manner: First, a table of the individual variables and parameters used in the algorithm 287 is shown. The variables are listed in an order logically consistent with the architecture shown in FIG. 5, rather than in their order of appearance in the algorithm 287. Second, a brief description of the steps is given as an overview. Third. a detailed description clarifying the algorithm 287 is given.

| Variable or Parameter | Description |
| --- | --- |
| $f_1, f_2, f_3, f_4$ | Digitized feature signals 283 (FIG. 11a) |
| $s_1, s_2, s_3, s_4$ | State variables used for high-pass filtering |
| $g_1, g_2, g_3, g_4$ | Filtered digitized feature signals |
| a | high-pass filter parameter |
| b | low-pass filter parameter |
| newwinner | Current output of winner-take-all 201 (FIG. 5), i.e. the feature location signal 157 (FIG. 5) |
| oldwinner | Output of winner-take-all 201 (FIG. 5) at previous time-step, i.e. the previous feature location signal 157 (FIG. 5) |
| timer | Measures time interval 231 (FIG. 9a) associated with valid transitions |
| direction | Computed direction output |
| dist | Parameter that stores distance d between photoreceptors 173 (FIG. 6b) |
| speed | Computed speed output |
| dt | Time delay duration |

| Step | Brief Description |
| --- | --- |
| 333 | Initialization |
| 335 | Read in digitized feature signals from ADC |

-continued

| Step | Brief Description |
|---|---|
| 337 | High-pass and low-pass filtering |
| 339 | Winner-take-all 201 (FIG. 5) |
| 341 | Detect transitions |
| 343 | Increments timer when no valid transitions occur |
| 345 | Outputs that no valid transition has occurred, when no transition has occurred |
| 347 | Time delay by dt used to control time discretization |
| 349, 355, 363 | Determine if transition is valid |
| 351 | Output that no valid transition has occurred, when a transition has occurred but is not valid |
| 353 | When any transition occurs, resets timer and stores current feature location signal 157 (FIG. 5) |
| 357 | Registers that a valid transition in the "left" direction has occurred |
| 359 | Computes speed from timer and distance |
| 361 | Outputs speed and direction when a valid transition occurs |
| 365 | Registers that a valid transition in the "right" direction has occurred |

Step 333 is for initialization. The variable timer is cleared. The variable oldwinner is set to the value 1. This forces the next transition detected by the algorithm 287 to be not valid. The use of subscripts in steps 333 and 337 should be noted by the reader.

Step 335 is where the ADC 281 (FIG. 11a) is directed to sample the feature signals 153 and where the digital computer 285 inputs the digitized feature signals 283 (FIG. 11a). Depending on the specific implementation, this step could consist simply of reading in the digitized feature signals 283 (FIG. 11a) or could be a complex algorithm directing the process by which the ADC 281 (FIG. 11a) digitizes the feature signals. The digitized feature signals 283 (FIG. 11a) are stored in the $f_i$ variables.

Step 337 is a step implementing high-pass and low-pass filter. The filtered versions of the digitized feature signals 283 (FIG. 11a) are stored in the $g_i$ variables. This step will be discussed in greater detail below.

Step 339 implements the feature tracker 155 (FIG. 5), which is comprised here of a WTA 201 (FIG. 8a). The variable newwinner implements the feature location signal 157 (FIG. 5). Note that in this embodiment, the variable newwinner performs the function of the entire feature location signal array 157 of FIG. 5. This is allowable because exactly one WTA output will be high at any given time and there are four WTA outputs. Thus the value of newwinner is an integer value between 1 and 4 inclusive. The value newwinner tells which filtered digitized feature location signals 283 (FIG. 11 a) $g_1$ through $g_4$ has the maximum value.

Steps 341 through 365, odd numbers, all implement the transition detection and speed measurement block 159 (FIG. 5). Step 341 checks to see if oldwinner and newwinner are the same. An affirmative means that no transition has occurred. In this case, timer is incremented in step 343 and the sensor gives "no valid transition" as an output. The method used to encode "no valid transition" depends on the specific requirements of the application using this invention.

When the answer to step 341 is negative, this means that a transition in the feature location signal 283 (FIG. 5) has occurred. Step 349 declares invalid any transition involving an end-line 233 (FIG. 9a). Steps 355 and 363 respectively detect valid transitions in the left and right directions, respectively. If the detected transition is found to be invalid, step 351 is executed in which the sensor give "no valid transition" as an output.

If the detected transition is valid, the variable direction is given the appropriate value in steps 357 or 365. At this point, the variable timer stores the time interval 231 (FIG. 9a) associated with the transition in time-steps. Then step 359 computes the speed from the time interval 231 (FIG. 9a). The measured speed and direction outputs are given in step 361. Note that step 359 could be excluded, and step 361 could be modified to output the variable timer instead of speed. In this case the sensor outputs the transition interval's duration 231 (FIG. 9a) rather than the speed measurement, which is an equivalent measurement.

When any transition occurs, step 353 is executed in which the timer variable is reset and the variable oldwinner is set to newwinner.

Step 347 implements a time delay. The duration dt of the time delay dictates how fast time is to be discretized and how fast the sensor (FIG. 10a) generally operates. Clearly the value dt depends on the specific implementation and on the specific application. It is suggested that dt be less than one tenth the time minimum transition time that it is expected the invention would experience under normal conditions.

Step 337 is now discussed in more detail. Those familiar with the field of digital signal processing will recognize the computations of step 337 as implementing a one-pole high-pass filter connected in series with a one-pole low-pass filter. The high-pass filter's cutoff frequency in radians-per-time-step is set by the parameter a, while the low-pass filter's cutoff frequency in radians-per-time-step is set by the parameter b, where one time step is approximately of duration dt. The purpose of the low-pass filter is to filter out noise that may occur as a result of electrical interference on the feature signal lines 279 (FIGS. 11a–b). The low-pass filter's cutoff should be set so that it is higher than the highest frequencies that would appear in the feature signals 279 as a result of moving texture 107 in the visual field 105. Thus, if the highest occurring frequency is $f_h$ Hz, then parameter b should be set so that $b > f_h * dt * 2\pi$.

The high-pass filter's cutoff frequency in radians-per-time-step is directed by parameter a. The purpose of the high-pass filter is to perform offset cancellation. Recall from above that in order for the sensor to function properly, the photoreceptor receptor fields 163 (FIG. 6b) must all be identical and the feature functions 181 (FIG. 11a) must be identical. Therefore, the photoreceptor circuits 291 (FIG. 11b) need to be identical and the differential amplifiers 197 (FIG. 7c) in the feature detectors 299 (FIG. 11b) need to be identical. Unfortunately as a result of variations that occur in integrated circuit fabrication processes, the photoreceptor circuits 291 (FIG. 11b) and the differential amplifiers 197 (FIG. 7c) in the feature detectors 299 (FIG. 11b) will be slightly different. Fortunately these mismatches can be modeled as small varying offset voltages that are added in series to the photoreceptor circuit outputs 311 (FIG. 13) and to the differential amplifier outputs 331 (FIG. 15). Due to the linear nature of the differential amplifiers 197 (FIG. 7c), the net effect of these offsets can be modeled as just a single offset voltage at the output of each differential amplifier 197 (FIG. 7c). The effect of this offset voltage is that each feature signal 299 is shifted up or down by a different but constant amount. By high-passing the digitized feature signals 283 (FIG. 11a), the constant voltage term is filtered out, thus canceling these offset terms. The cutoff frequency of the high-pass filter should be set lower than the lowest frequencies that would appear in the feature signals 279 (FIGS. 11a–b) as a result of moving texture 107 (FIG. 1) in the visual field 105 (FIG. 1). Thus, if the lowest occurring frequency is $f_l$ Hz, then parameter a should be set so that $a < f_l * dt * 2\pi$.

In summary the first preferred embodiment is a hybridized version of the present invention in which the photoreceptors 147 (FIG. 5) are implemented with optical smoothing and analog circuitry, the feature detectors 151 (FIG. 5) are implemented in analog circuitry, and the remainder is implemented as an algorithm 287 on a digital computer 285 (FIG. 11a). At the time of this writing, this embodiment is the one that has been built and tested. In tests on a working version of this embodiment, optic flow has been measured on moving textures that had contrasts of several percent and less.

DETAILED DESCRIPTION OF THE SECOND PREFERRED EMBODIMENT

The second preferred embodiment will now be discussed. In this second embodiment, the sensor 99 from the photoreceptor circuits 147 (FIG. 5) through the transition detection and speed measurement block 159 (FIG. 5) is implemented all in analog circuitry. The advantage of this embodiment is that the circuitry can be implemented compactly on an integrated circuit. The disadvantage of this embodiment is that it's accuracy may not be as high as that of the first preferred embodiment.

Figure 17:
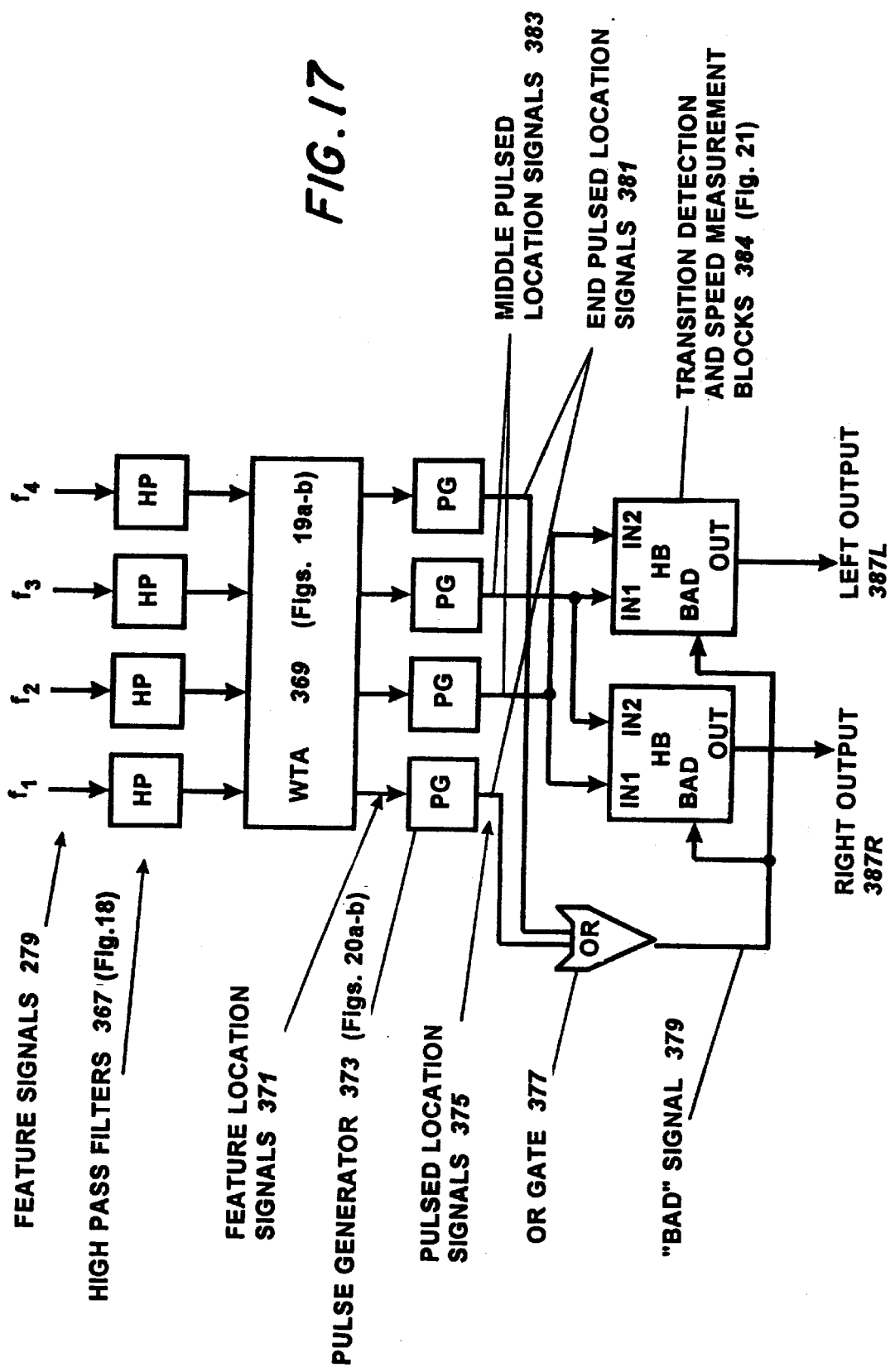
FIG. 17 illustrates the structural elements of the second preferred embodiment, minus the photoreceptor array.

Both the photoreceptor array 147 (FIG. 5) and array of feature detectors 151 (FIG. 5) are the same as in first preferred embodiment, described above. FIG. 17 shows the remaining structural elements as they are implemented in the second embodiment. An array of four high-pass filters 367 receives as input the four feature signals 279. A WTA circuit 369 receives as input the outputs of the four high-pass filters 367 and generates four feature location signals 371. Each feature location signal 371 is passed through an associated pulse generator 373 to generate a pulsed location signal 375. An "OR" 377 gate generates a BAD signal 379 by OR-ing the two end pulsed location signals 381. The BAD signal 379 and the two middle pulse location signals 383 provide input to two transition detection and speed measurement half blocks 384. The output of these blocks 384 form respectively a left signal 387L and a right signal 387R.

Also shown in FIG. 17 are references to other figures used to describe the individual structural elements. These elements of FIG. 17 will now be discussed in more detail.

Figure 18:
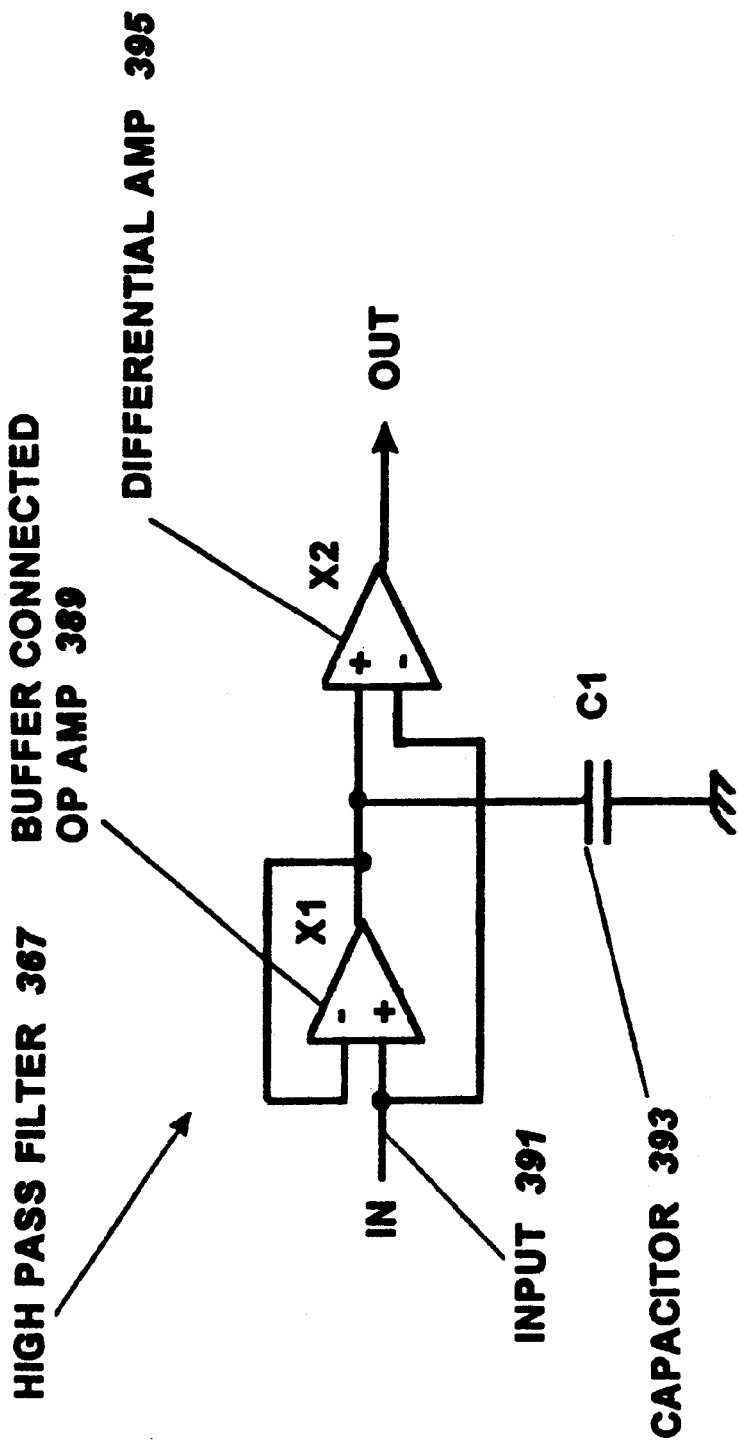
FIG. 18 shows a high-pass filter.

The high-pass filters 367 perform offset cancellation just as in the first embodiment. However, in this embodiment they are implemented as analog circuits. FIG. 18 shows a circuit diagram of a high-pass filter 367. Differential amplifier 389 receives the input 391 and is connected in the buffer configuration. A capacitor 393 is connected between the output of amplifier 389 and ground. Differential amplifier 395 measures the difference between the input signal 391 and the voltage across capacitor 393. The output of amplifier 395 forms the output of the high-pass filter 367. This is a simple one-pole high-pass filter. The voltage across capacitor 393 is a low-passed version of the input signal 391. The cutoff frequency depends on capacitor 393 and the small signal output resistance of amplifier 389. Therefore, amplifier 389 should be a high-gain differential amplifier with a high small signal output resistance. This can be done by using the differential amplifier circuit of FIG. 15, where the transistors are very long and the bias voltage 330 is set low. Amplifier 395 subtracts the low-passed version of the input signal from the input signal 391, thereby generating a high-passed version of the input. Amplifier 395 can be a differential amplifier of relatively low gain. Note that in order to minimize the offset caused by these circuits, the transistors used in all of these circuits should be relatively large. Note, though, that due to the large gain provided by the feature detector differential amplifiers 197 (FIG. 7c), the offset introduced by this high-pass filter circuit will be small compared to the offset being canceled.

FIGS. 19a and 19b show one realization of the WTA circuit 369. FIG. 19a shows a single WTA cell 397, it's input 399, it's output 401, it's connection to the inhibition line 403, and a high gain differential amplifier 405. FIG. 19b shows how the four WTA cells 397 are connected to the inputs 407, the outputs 409, and the inhibition line 403. The inhibition line 403 is shared among all four cells 397. This circuit is not strictly a WTA 201 circuit as described above and shown in FIG. 8. This circuit 369 produces one winner when the voltage signals are close together, but when one of the inputs 407 is extremely low, several of the outputs 409 will register as winners. However, the sensor as a whole will still function properly.

In FIG. 17, each feature location signal 371 connects to an associated pulse generator circuit 373. The output 439 of the pulse generator circuits 373 form pulsed feature location signals 375 The function of the pulse generator circuit 373 is to generate a high pulse of short duration whenever it's input transitions from low to high.

Figures 20A, 20B:
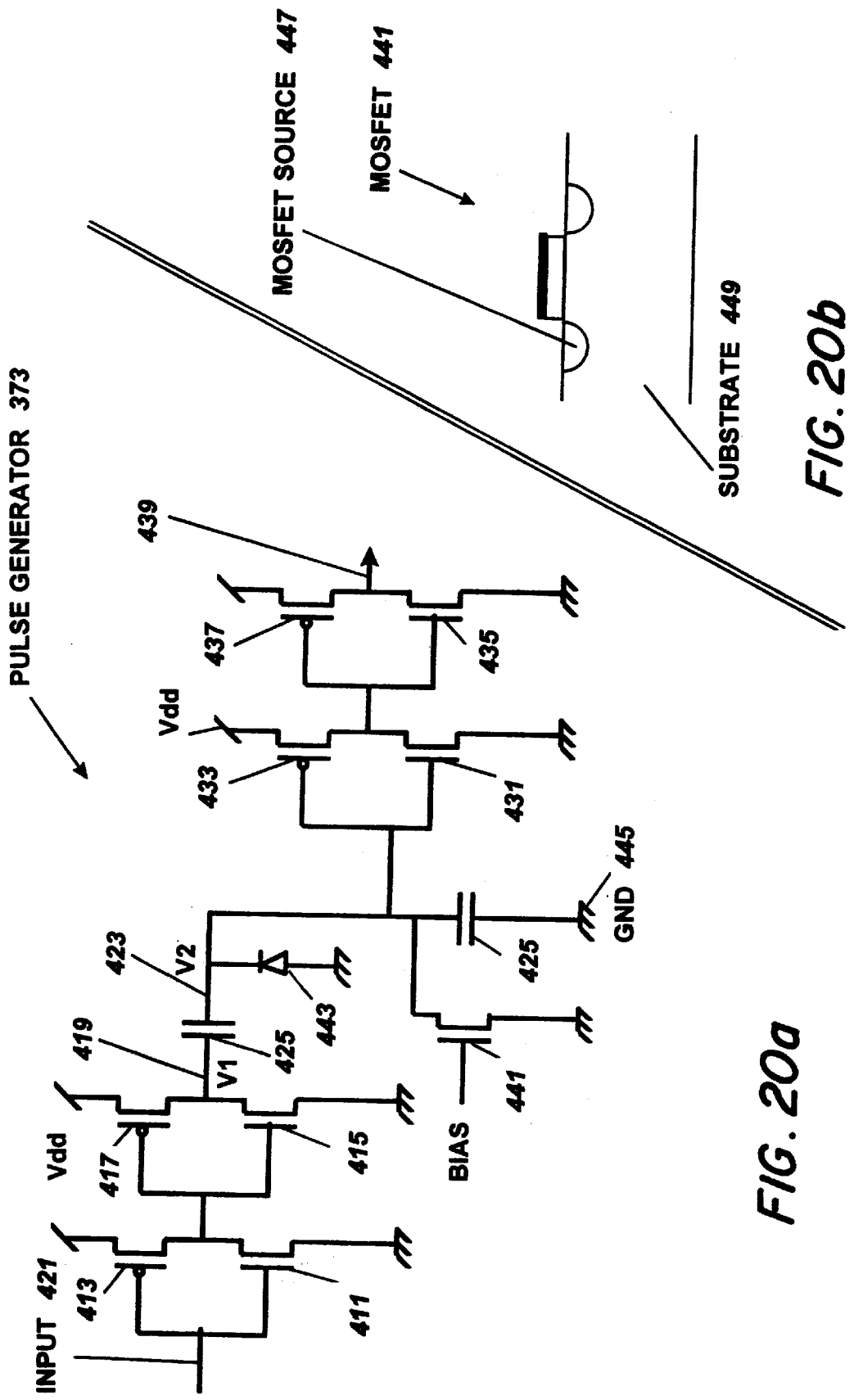
FIGS. 20a and 20b show a pulse generating circuit used as a WTA output conditioner.

FIG. 20a shows a schematic diagram of a pulse generator circuit 373. MOSFETs 411, 413, 415, and 417 form a buffer whose output signal V1 419 sharply transitions high when the input voltage 421 rises above a threshold set by the MOSFET geometries. This causes V2 423 to rise. MOSFETs 431, 433, 435, and 437 also form a buffer, which causes the output voltage 439 to sharply rise when the voltage V2 rises. Capacitor 425 then charges through MOSFET 441, causing voltage V2 to fall. When voltage V2 lowers enough, the buffer implemented by MOSFETs 431 through 437 causes the output voltage 439 to sharply lower. When the input voltage 421 lowers, the voltage V1 lowers. Diode 443 prevents the voltage V2 from lowering significantly below GND 445.

FIG. 20b shows how diode 443 can be implemented as a parasitic diode in any P-substrate chip fabrication process, where the substrate is tied to GND. Essentially the diode 443 is formed between the N-diffusion 447 associated with transistor 441 and the P-substrate 449. Thus, no diode specifically needs to be laid out.

As shown in FIG. 17, the two end pulsed location signals 381 are ORed through an OR gate 377 to form the BAD signal 379. Recall that any transition involving an end feature location line 381 is invalid. Thus. it does not matter which end feature location signal 381 is involved in such a transition. The BAD signal 379 and the two middle pulsed location signals 383 provide input to two transition detection and speed measurement half-block circuits 384.

Figure 21:
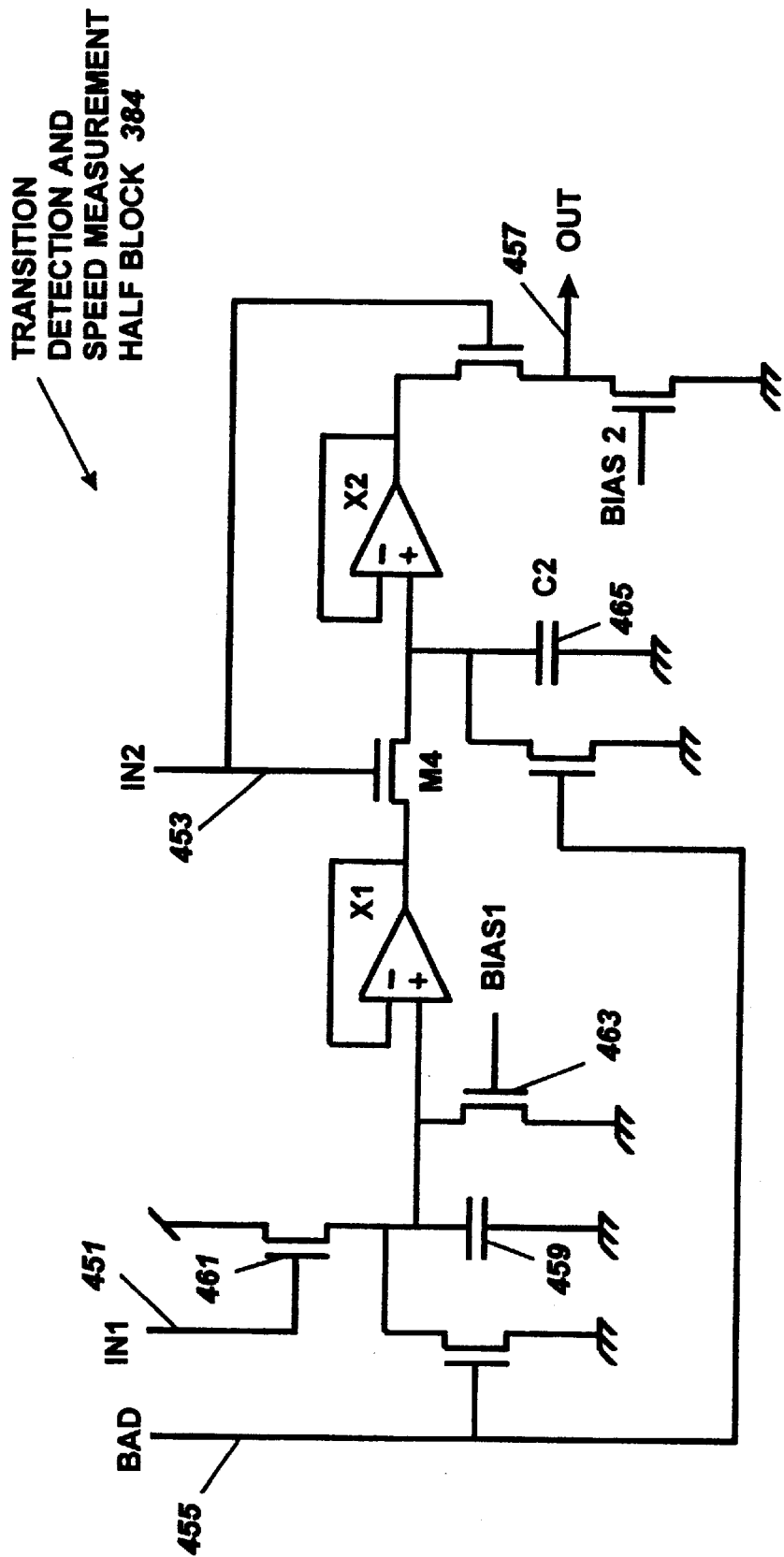
FIG. 21 illustrates a transition detection and speed measurement half-block.

FIG. 21 shows the schematic of a transition detection and speed measurement half block 384. The function of this circuit 384 is as follows. When it's IN1 input 451 is pulsed high and then it's IN2 input 453 is pulsed high somewhat later, without the BAD 455 input strobing high in between, the circuit 384 produces a voltage at the output 457 that represents the time interval between when the IN1 451 and IN2 453 lines each were pulsed high. The output 457 provides the output signal for the duration of the IN2 453 input pulse. When a half block circuit 384 is generating no output, it s output 457 is zero volts.

The circuit 384 functions as follows: When the IN1 451 strobes high, capacitor 459 is charged high via MOSFET 461. Capacitor 459 then slowly discharges through MOSFET 463. To support long time intervals, MOSFET 463 should be a long MOSFET and be biased in or near the subthreshold region. When IN2 453 strobes high, Capacitor 465 samples the voltage across 459. The voltage across 465 is then provided as an output. If the BAD 455 input strobes high before IN2 453 strobes high, then capacitor 459 is discharged, thus allowing no output when IN2 453 strobes high. Note that the output voltage 457 given is negatively related to the time interval between IN1 451 and IN2 453 strobing high: the longer the interval, the lower the output voltage 457.

The two transition detection and speed measurement half blocks 384 (FIG. 21) are connected so that one looks for transitions in each direction. When a valid transition occurs, the appropriate half block generates an output while the other half block generates no output.

In summary, the second preferred embodiment of FIG. 17 is a full analog implementation (excepting the OR gate 377) of the sensor. The photoreceptors 147 and the feature detectors 151 are implemented as in the first preferred embodiment. The feature tracker 155 and the transition detection and speed measurement block 159 are also implemented in circuitry. All the circuitry for this sensor could be implemented on a single integrated circuit.

DESCRIPTION OF ALTERNATIVE IMPROVEMENTS AND EMBODIMENTS

The above two suggested embodiments and preferred ways of implementing the sensor have been discussed. However there are other embodiments that are possible and practical, depending on the specific application and on technological advances. Furthermore, there are additions that could be made to the sensor 99 to improve the sensor's performance under difficult conditions. In the following section alternative embodiments and improvements are discussed.

Figure 22:
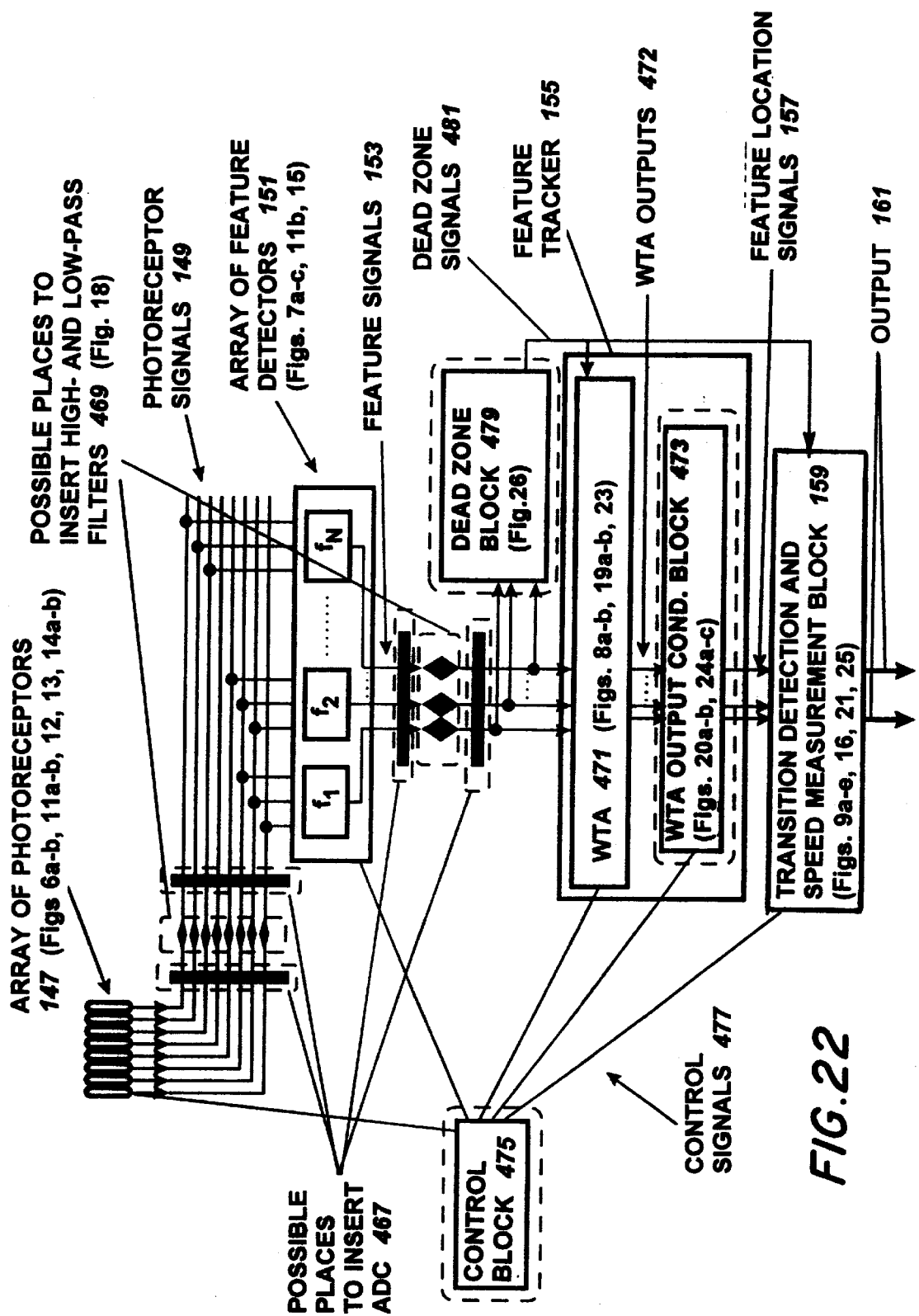
FIG. 22 shows a generalized version of the present invention that encompasses different variations.

FIG. 22 shows a comprehensive diagram that captures the alternative embodiments and improvements that will be discussed here. FIG. 22 is essentially an expansion of FIG. 5. Shown are the photoreceptor array 147, the photoreceptor signals 149, the feature detectors 151, the feature tracker 155, and the transition detection and speed measurement block 159, all from FIG. 5. Also shown are four possible places to insert the optional ADC 467 and two possible places to optionally insert high-pass filters, low-pass filters, or both high-pass and low-pass filters in series 469. The choice of which locations to use is implementation dependent. The feature tracker 155 is shown as comprising a generalized WTA 471 and it outputs 472, and a WTA output conditioning block 473. Two optional additions are also shown: First is a control block 475 outputting assorted control signals 477. Second is a dead zone block 479 outputting a dead zone signal 481. The structural elements shown in FIG. 22 are included with references to all other figures used to describe the individual structural elements in detail.

A first set of alternative embodiments is generated by varying which structural elements are implemented in analog circuitry and which are implemented in a digital computer. At this point the analog signals need to be digitized by an inserted analog to digital converter. The point at which the ADC is inserted becomes a transition point between analog signal processing and digital signal processing. For example, in the first preferred embodiments (FIGS. 11a and 11b) the transition from analog to digital occurs after the feature signals 279, while in the second preferred embodiment (FIG. 17) essentially the entire sensor is implemented in analog circuitry. The first embodiment could be varied so that the photoreceptor signals 297 are digitized rather than the feature signals 279. In this case the algorithm on the digital computer would have to include a step to compute the feature signals 279. It is also possible to implement the entire sensor on a digital computer. such that the computer receives input from a CCD-based camera, then computes the photoreceptor signals 149 and the rest of the sensor's behaviors as an algorithm. Such an embodiment is possible, but in the opinion of the applicant is not practical, except as a means of modeling new sensor embodiments prior to fabrication. However all of these alternative embodiments are considered within the scope of this invention.

More variations can be made on those of the previous paragraph by varying where high-pass and low-pass filters are placed. Unless the photoreceptor circuits 291 are identical and the feature detector circuits 299 are identical, offset cancellation is required. As described above, offset cancellation can be performed by high-pass filters. Thus it is possible to perform offset cancellation with analog high-pass filters, such as the filter 367 as shown in FIG. 18 and then digitize these signals. This can be done to either the photoreceptor signals 149 or to the feature signals 153, as shown in FIG. 22. Furthermore it may be desirable to include low-pass filters at different locations of the sensor as well to eliminate interfering noise, as was done in the first preferred embodiment. All such alternative embodiments are considered within the scope of this invention.

A second set of alternative embodiments is generated by using clock-driven circuits rather than asynchronous circuits. Two reasons for this approach are: 1) There are many differential amplifier circuits in the open literature that have offset cancellation but require refresh cycles to keep the offset properly canceled. This requires interrupting the use of the differential amplifier for a period of nanoseconds or microseconds while the offset is properly canceled. 2) There are many practical WTA circuits in the open literature that need to be reset before every time they compute a winner. Thus if any of these circuits are used a set of clock signals need to be regularly sent to the various circuits to ensure proper operation of the sensor. These clock signals can be generated by a control block 475, as shown in FIG. 22. If part of the sensor 99 is implemented as an algorithm on a digital computer, then the control block 475 may be implemented as additional steps in the algorithm, and there can be outputs from the digital computer that function as a source of control signals 477 to the clock-driven circuits. All of these embodiments are considered within the scope of this invention.

A third set of alternative embodiments are generated from the different ways photoreceptor arrays 147 can be implemented. All the photoreceptor arrays described in the previously mentioned and co-pending patent applicant entitled "A photoreceptor array for linear optic flow measurement", can be used. In fact, the photoreceptor array used need not even be a linear one-dimensional array. What is essential is that the feature detectors map into a linear array in the visual field 105 (FIG. 1). All of these embodiments are considered within the scope of this invention.

A fourth set of alternative embodiments can be generated by using variations of the basic WTA 201 first introduced in FIG. 8. FIG. 22 shows the feature tracker 155 comprising a generalized WTA 471 and a WTA output conditioning block 473. These components or elements will be discussed. All these types of WTA's are called generalized WTA's.

FIGS. 23a through 23e show the operation of four different types of WTA's. For this example assume N=7. Thus, the generalized WTA 471 is seven inputs and seven outputs wide. FIG. 23a shows seven analog input signals 483. FIG. 23b shows the outputs 485 that would be generated by the simple WTA of the type discussed previously. The output 487 corresponds to the input with the highest of the input signals. FIG. 23c shows what the output 489 would be of a variation of the WTA called the kWTA, for "k-winners-take-all". In this variant, the k output lines 491 corresponding to the k highest of the input lines 483 are set high. The value k is set equal to 2 outputs on in this example. FIG. 23d shows what would be the outputs 493 of a third WTA variation called the LWTA for "local-winners-take-all". In this case an output line 491 is set high if and only if it's corresponding input line 483 is higher than all other input lines within a certain radius (or distance) of that input line. For FIG. 23d the radius is 4. Thus the right-most output 495 is high because the four closest inputs on the left side 497 all have lower input values. If there were inputs to the right, the input value would have to be higher then the four closest to the right as well. FIG. 23e shows the output 499 of another variant of the WTA circuit called the kLWTA for "k-local-winners-take-all". The kLWTA combines characteristics of the kWTA and the LWTA. In the kLWTA an output line 491 is set high if it's input line 483 is one of the k highest lines within a specified radius. In the example shown in FIG. 23e the radius is 2. Note that equivalent loser-take-all (LTA) versions can be made of all the above WTA variations. All the WTA and LTA variations above, as well as ones of similar function, fall within the scope of a generalized WTA.

Figure 23G:
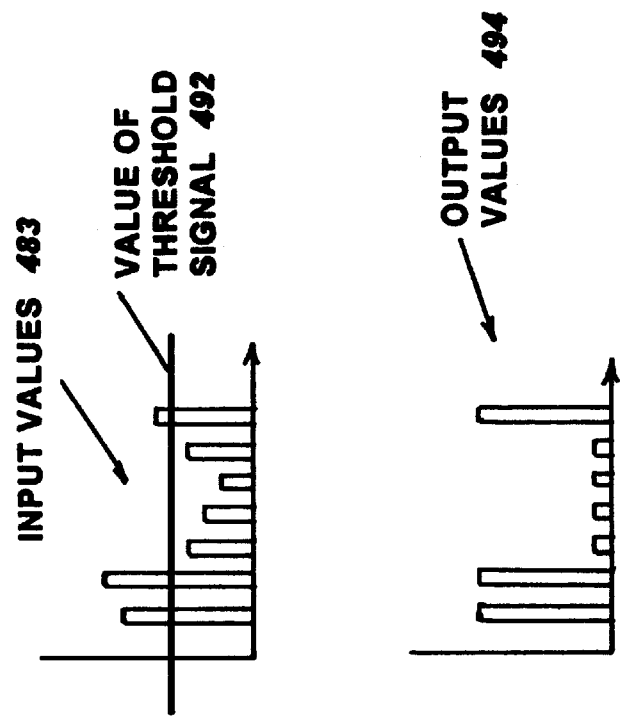
Figure 23F:
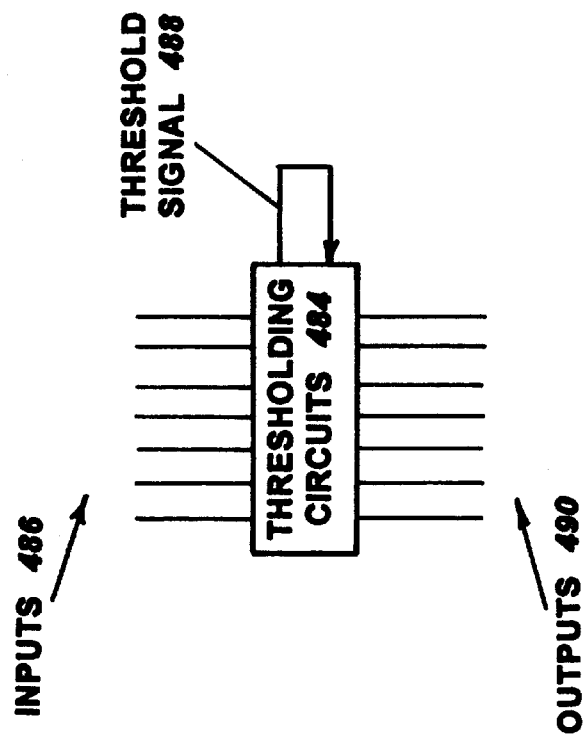

FIGS. 23f and 23g show such a similar circuit that falls within the scope of the generalized WTA. This is called a thresholding circuit 484. Shown also in FIG. 23f is the thresholding circuit inputs 486, a threshold signal 488, and the outputs 490. The thresholding circuit 484 computes a threshold signal 488 from it's inputs 486. For example, such a threshold signal 488 could be the average of the input signals 486. The threshold signal 488 could also be just a constant value. Then the thresholding circuit 484 compares it's inputs 486 with the threshold signal 488. Then all the corresponding outputs 490 whose input signals 486 are greater than (or less than) the thresholding signal 488 are set high, while the other outputs 490 are set low.

FIG. 23g is used to depict the operation of the thresholding circuit 484. Shown are the same analog input signals 483 from FIG. 23a, the value 492 of the threshold signal, and the corresponding outputs 494. Note that all outputs 494 whose corresponding inputs 483 are higher than the threshold signal value 492 are set high.

Those skilled in the art, upon reading the above variations of the generalized winner-take-all scheme, will conceive other types of generalized WTA's whose function is similar to the generalized WTA's discussed above. All such variations that preserve the spirit of the generalized WTA, including the thresholding circuit, are considered within the scope of this invention.

Recall that the first preferred embodiment (FIGS. 11a and 11b) contains the version of the WTA 201 where only one output line is high. Thus, this sensor may not function properly if it uses one of the other generalized WTA 471 variants. FIG. 24a shows a hypothetical set of waveforms 501 generated by a generalized WTA 471. Note that some of the pulses overlap, which could cause problems in the rest of the algorithm 287 (FIG. 11a). The purpose of the WTA output conditioning block 473 (FIG. 22) is to "fix" the WTA output lines 472 so that only one output is high at a time, while preserving the general trend of high WTA output line movements. To do this, one could use a WTA output conditioner or conditioning circuit 473 (FIG. 22) to generate a suitable set of feature location signals 157 by the following simple method: whenever a WTA output line 472 transitions high, set the corresponding feature location signal 157 high and then set the other feature location signals 157 low. If the corresponding feature location signal 157 already is high, do nothing. FIG. 24b shows the set of corresponding feature location signals 503 that would be generated by this method. Thus if this method were inserted in between steps 339 and 341 of the algorithm 287 (FIG. 16), any generalized WTA 471 could be used at step 339. The means of implementing a WTA conditioning step in the first preferred embodiment should be well known to those skilled in the art. Such a step could be implemented in several lines of computer program code.

Another type of WTA output conditioner 473 would generate pulses whenever the corresponding generalized WTA 471 output transitions from low to high. The outputs of such a WTA output conditioner 473 would be pulsed feature location signals, much like those of the second preferred embodiment. FIG. 24c shows a hypothetical output 505 of such a WTA conditioner 473 when given the WTA outputs 472 of FIG. 24a. The pulse generators 373 (FIG. 17) of the second preferred embodiment perform exactly this function. Therefore, a generalized WTA 471 can indeed be used in the second preferred embodiment.

These WTA output conditioners are being presented to the reader as useful additions to the present invention. They are useful because 1) they allow new types of transition detection and speed measurement blocks 159 (FIG. 22) to be implemented, and 2) they allow more generalized WTA's 471 (FIG. 22) to be used. All such variations are considered within the scope of this invention.

Another set of alternative embodiments is generated by considering sensors with simpler outputs. The above sensors give both speed/time and direction measurements. Recall that time measurements associated with valid transitions and resulting speed measurements are considered equivalent because one value would determine the other. Thus the output could be a time measurement or a speed measurement and provide essentially the same information. Other embodiments could be designed that capture the spirit of this invention yet measure only speed or only direction. Likewise other embodiments could be designed for applications where the optic flow will be in only one direction, hence valid transitions in the opposite direction need not be considered. All such alternative embodiments that capture the spirit of this invention are considered within the scope of this invention.

Figure 25:
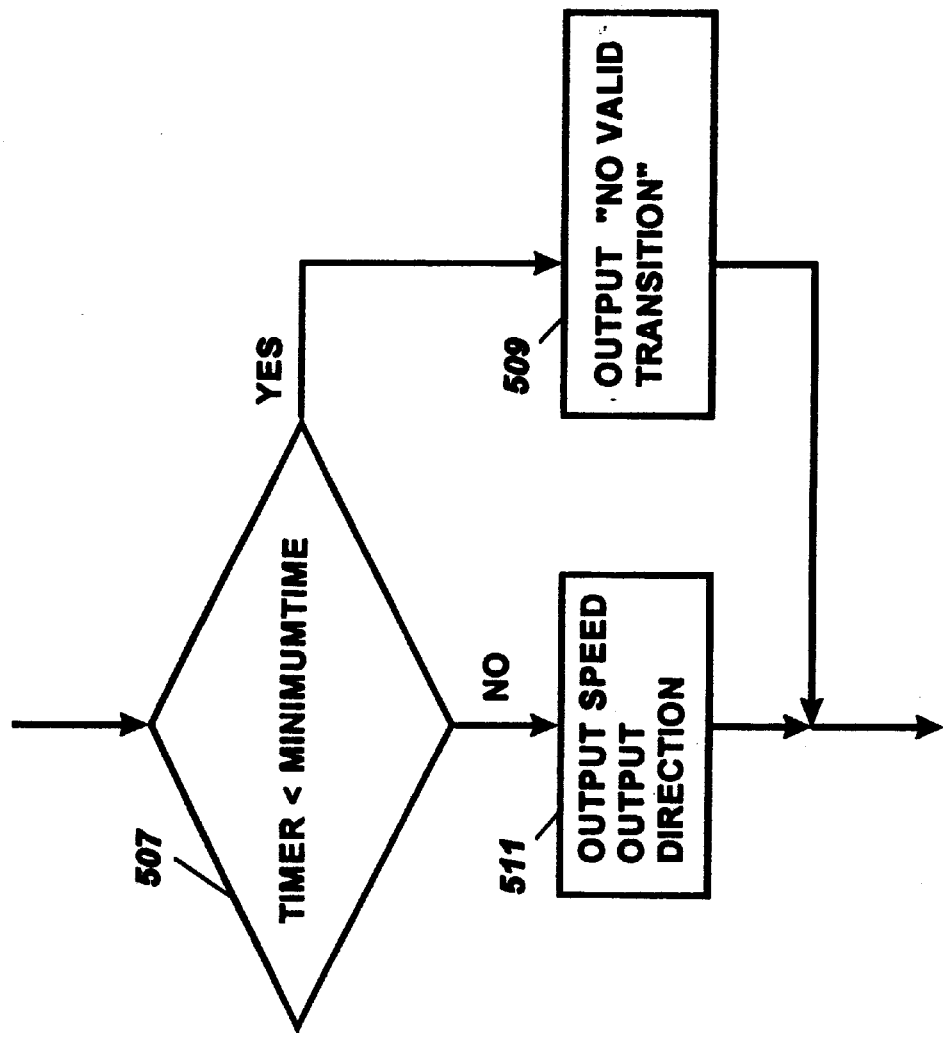
FIG. 25 shows how the transition detection and timing circuit can be modified so that valid transitions with intervals less than a predetermined minimum value are ignored.

Another alternative embodiment is formed from a simple modification to the transition detection and speed measurement block 159 that can improve it's performance in low texture contrast environments. This modification further constrains what is to be considered a valid transition. This modification is to ignore any valid transitions whose associated transition interval 231 (FIG. 9a) is under a certain minimum value. This constraint helps to eliminate from consideration transitions that are detected from noise corruption of the photoreceptor signals 149 or the feature signals 153. This minimum time value should be set below the smallest transition intervals 231 that would result from normal operation of the sensor in it's intended environment. FIG. 25 shows how to implement this modification in the first preferred embodiment. Step 361 of the algorithm 287 (FIG. 16) is replaced with the steps 507, 509, and 511 shown in FIG. 25. The parameter minimumtime represents the minimum transition interval duration that will be considered valid. Step 507 checks to see if the transition interval is less than minimumtime. If affirmative, step 509 is executed in which "no valid transition" is given as an output. If negative, the speed and direction measurements are given as output. Those skilled in the art will recognize ways of implementing this modification in other embodiments. All such modifications are considered within the scope of this invention. For example, a comparator and additional logic can be used to implement this improvement in the second preferred embodiment.

Another alternative embodiment is formed from another addition to the sensor that can improve it's performance in low texture contrast environments. The dead zone block 479 (FIG. 22) receives input from the feature signals 153 and generates a dead zone signal 481. The dead zone signal 481 provides additional input to the feature tracker 155 or to the transition detection and speed measurement block 159, depending on the specific implemention. The dead zone block 479 functions as follows: if all of the feature signals 153 have values within a "dead zone range" then the dead zone signal 481 is set high. Otherwise the dead zone signal 481 is set low. When the dead zone signal 481 is high it inhibits the detection of valid transitions by either 1) forcing one of the end feature location signals 233 (FIG. 9a) to be high while forcing the other feature location signals 157 low, or 2) forcing the transition detection and speed measurement block 159 to declare all valid transitions invalid. The motivation for the dead zone block 479 and signal 481 is that when the texture 107 in the visual field 105 (FIG. 1) has a low contrast, the signal strength of the photoreceptor signals 149 and feature signals 153 may be less than the strength of corrupting noise. For many feature detectors 151, such as the differential amplifier 191 used in both preferred embodiments, the feature signals 153 will tend to stay within a narrow range when the texture contrast is too low. Thus if all feature signals 153 are within that narrow range, it is an indication that the contrast in the visual field 105 may be too small to provide accurate measurements. Hence any detected valid transitions are suspect and should be ignored. In implementation. the dead zone is selected to implement this narrow range of feature values associated with excessively low contrast.

Figure 26:
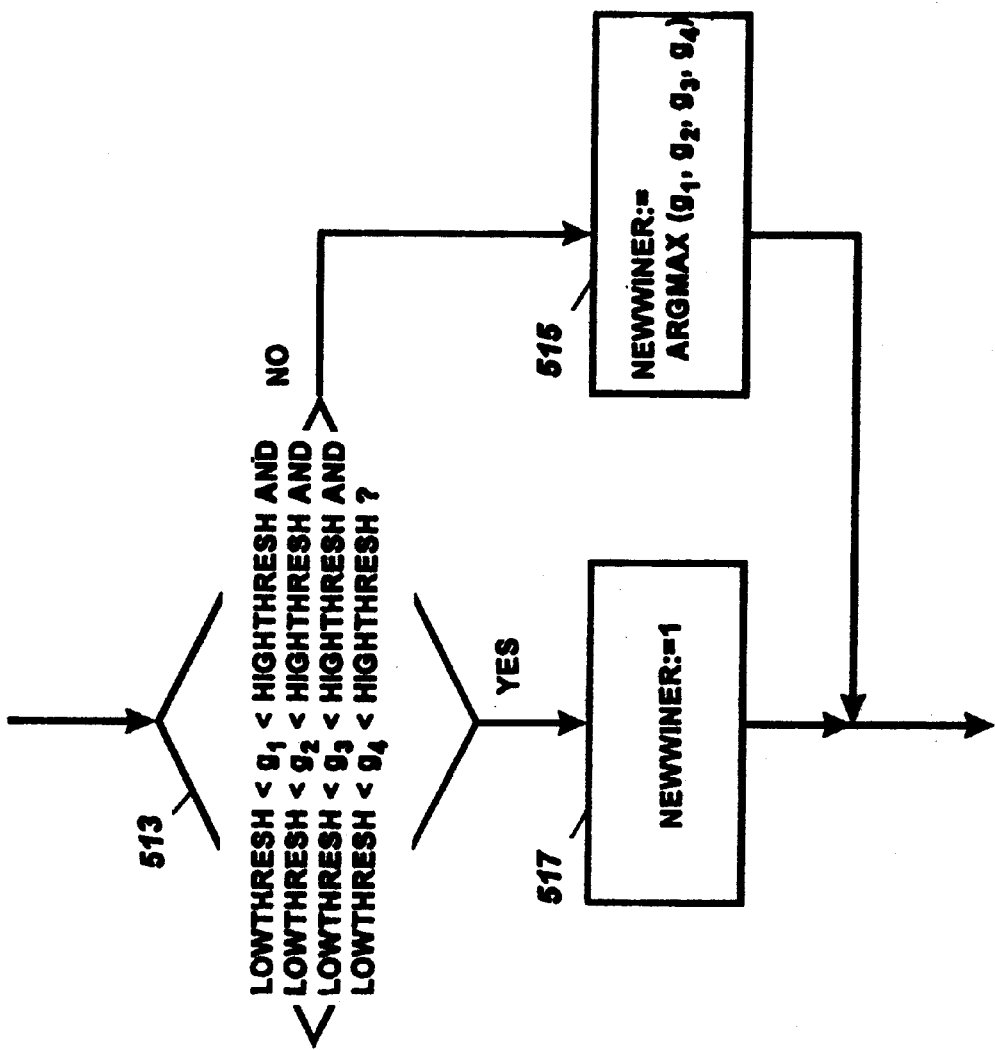
FIG. 26 illustrates how the dead-zone circuit would be implemented in the first preferred embodiment.

FIG. 26 shows three steps 513, 515, and 517 that implement the dead zone block 479 and signal 481 in the first preferred embodiment. Simply replace step 339 of algorithm 287 (FIG. 16) with the contents of FIG. 26. The parameters lowthresh and highthresh define the limits of the dead zone. Step 513 checks to see if all the filtered digitized feature signals g1 through g4 are within the dead zone. If affirmative, step 517 is executed in which the WTA is forced to register the first feature signal 153 (FIG. 5) as having the highest value. Because transitions to and from end lines are invalid, this step effectively quiets the sensor output. If negative, step 515 executes the WTA as originally performed in step 339. Those skilled in the art will conceive means of implementing the dead zone block 479 and signal 481 in other embodiments of the present invention that preserve the spirit of this addition. For example, an array of comparators and additional logic can be used to implement the computation of the dead zone signal 481 and it's effect on the transition detection and speed measurement block 159. All such additions are considered within the scope of this invention.

What is claimed and desired to be secured by Letters Patent of the United States is:

1. A linear optic flow sensor system comprising:
   an array of photoreceptors responsive to a visual field for generating a plurality of photoreceptor signals;

a plurality of substantially identical feature detectors responsive to said plurality of photoreceptor signals for generating a plurality of feature signals;

a feature tracker responsive to said plurality of feature signals for generating a plurality of feature location signals, said feature tracker comprising a winner-take-all, where said winner-take-all is selected from the group consisting of simple winner-take-all circuits, local winner-take-all circuits, k winner-take-all circuits, and k local winner-take-all circuits; and a transition detection and speed measurement circuit responsive to said feature location signals for providing an output comprised of at least one measurement selected from the group consisting of a speed measurement, a direction measurement, and speed and direction measurements;

whereby an optic flow measurement is obtained from said measurements and the physical geometry of said feature detectors.

2. The linear optic flow sensor system of claim 1 wherein:
   said array of photoreceptors are arranged substantially in a linear array along a sensor orientation vector; each said photoreceptor has an identical receptive field substantially comprising a shape selected from the group consisting of a point, a predetermined smoothing function, a rectangle, and a blurry rectangle.

3. The linear optic flow sensor system of claim 1 wherein:
   said transition detection and speed measurement circuit generates said measurements whenever a valid transition occurs in said feature location signals.

4. The linear optic flow sensor system of claim 2 wherein:
   said transition detection and speed measurement circuit generates said measurements whenever a valid transition occurs in said feature location signals.

5. The linear optic flow sensor system of claim 2 further including means for digitizing said photoreceptor signals, and wherein:
   said feature detection circuits are implemented with digital circuitry;
   said winner-take-all circuit is implemented with digital circuitry; and
   said transition detection and speed measurement circuit is implemented with digital circuitry.

6. The linear optic flow sensor system of claim 5 wherein:
   said photoreceptor array is implemented in analog circuitry; and
   said feature detection circuits, said winner-take-all circuit, and said transition detection and speed measurement circuit are implemented in the form of digital logic or as an algorithm on a digital computer.

7. The linear optic flow sensor system of claim 3 further including means for digitizing said photoreceptor signals and wherein:
   said feature detection circuits are implemented with digital circuitry;
   said winner-take-all circuit is implemented with digital circuitry; and
   said transition detection and speed measurement circuit is implemented with digital circuitry.

8. The linear optic flow sensor system of claim 7 wherein:
   said photoreceptor array is implemented in analog circuitry; and
   said feature detection circuits, said winner-take-all circuit and said transition detection and speed measurement circuit are implemented in the form of digital logic or as an algorithm on a digital computer.

9. The linear optic flow sensor system of claim 4 further including means for digitizing said photoreceptor signals and wherein:
said feature detection circuits are implemented with digital circuitry;
said winner-take-all circuit is implemented with digital circuitry; and
said transition detection and speed measurement circuit is implemented with digital circuitry.

10. The linear optic flow sensor system of claim 9 wherein:
said photoreceptor array is implemented in analog circuitry; and
said feature detection circuits, said winner-take-all circuit, and said transition detection and speed measurement circuit are implemented in the form of digital logic or as an algorithm on a digital computer.

11. The linear optic flow sensor system of claim 2 further including means for digitizing said feature signals, and wherein:
said winner-take-all circuit is implemented with digital circuitry; and
said transition detection and speed measurement circuit is implemented with digital circuitry.

12. The linear optic flow sensor system of claim 11 wherein:
said photoreceptor array and said feature detection circuits are implemented in analog circuitry; and
said winner-take-all circuit and said transition detection and speed measurement circuit are implemented in the form of digital logic or as an algorithm on a digital computer.

13. The linear optic flow sensor system of claim 3 further including means for digitizing said feature signals, and wherein:
said winner-take-all circuit is implemented with digital circuitry; and
said transition detection and speed measurement circuit is implemented with digital circuitry.

14. The linear optic flow sensor system of claim 13 wherein:
said photoreceptor array and said feature detection circuits are implemented in analog circuitry; and
said winner-take-all circuit and said transition detection and speed measurement circuit ar implemented in the form of digital logic or as an algorithm on a digital computer.

15. The linear flow sensor system of claim 4 further including means for digitizing said feature signals, and wherein:
said winner-take-all circuit is implemented with digital circuitry; and
said transition detection and speed measurement circuit is implemented with digital circuitry.

16. The linear optic flow sensor system of claim 15 wherein:
said photoreceptor array and said feature detector circuist are implemented in analog circuitry; and
said winner-take-all circuit and said transition detection and speed measurement circuit are implemented in the form of digital logic or as an algorithm on a digital computer.

17. A method for measuring linear optic flow comprising the steps of:
computing a plurality of photoreceptor signals from a visual field, the photoreceptor signals associated with a plurality of photoreceptors in the visual field;
computing a plurality of feature signals from the photoreceptor signals;
computing at least one feature location signal from the feature signals, said step selected from the group consisting of computing a winner-take-all function, computing a k winner-take-all function, computing a local winner-take-all function, and computing a k local winner-take-all function;
detecting valid transitions from the feature location signals; and
a step selected from the group consisting of measuring the time interval associated with the valid transitions, determining the direction associated with the valid transitions, and both measuring the time interval and determining the direction associated with the valid transitions;
whereby the optic flow may be determined from the time interval, the detected direction, and the geometry associated with the photoreceptor signals.

18. The method of claim 17 wherein the photoreceptors associated with the photoreceptor signals are in a linear array in the visual field.

19. The method of claim 18 wherein the receptor fields of the photoreceptors associated with the photoreceptor signals:
are identical; and
are substantially shaped in the shape selected from the group consisting of a point, a predetermined smoothing function, a rectangle, and a blurry rectangle.

20. A linear optic flow sensor system comprising:
means responsive to a visual field for generating a plurality of feature signals;
a feature tracker responsive to said feature signals for generating at least one feature location signal, said feature tracker comprising means for computing the function selected from the group consisting of a winner-take-all function, a k winner-take-all function, a local winner-take-all function, and a k local winner-take-all function; and
means responsive to said feature location signals for producing an output comprising at least one measurement selected from the group consisting of a speed measurement, a direction measurement, and both a speed and direction measurement;
whereby an optic flow measurement is obtained from said measurements and from the geometry of said feature signals.

21. The linear optic flow sensor system of claim 20 wherein said means for generating said feature signals comprises:
an array of photoreceptors responsive to said visual field for generating a plurality of photoreceptor signals; and
a plurality of substantially identical feature detectors responsive to said photoreceptor signals for generating a plurality of feature signals.

22. The linear optic flow sensor system of claim 20 wherein said means for producing said output comprises a transition detection and speed measurement circuit responsive to said feature location signals for providing an output comprised of at least one measurement selected from the group consisting of a speed measurement, a direction measurement, and a speed and direction measurement, whereby an optic flow measurement is obtained from said measurements and the geometry of said feature detectors.

23. The linear optic flow sensor system of claim 21 wherein said means for producing said output comprises a transition detection and speed measurement circuit responsive to said feature location signals for providing an output comprised of at least one measurement selected from the group consisting of a speed measurement, a direction measurement, and a speed and direction measurement, whereby an optic flow measurement is obtained from said measurements and the geometry of said feature detectors.

24. A linear optic flow sensor system comprising:

an array of photoreceptors responsive to a visual field for generating a plurality of photoreceptor signals;

a plurality of substantially identical feature detectors responsive to said photoreceptor signals for generating a plurality of feature signals, each said feature detector having at least two inputs;

a feature tracker responsive to said plurality of feature signals for generating a plurality of feature location signals, said feature tracker comprised of a generalized WTA circuit;

means responsive to said feature location signals for detecting valid transitions; and means responsive to said valid transition detection means for generating an output comprised of at least one measurement selected from the group consisting of a speed measurement, a direction measurement, and both a speed and direction measurement;

whereby an optic flow measurement is obtained from said measurements and the geometry of said feature detectors.

25. The linear optic flow sensor system of claim 24 wherein:

said photoreceptors are implemented with analog circuitry;

said feature detectors are implemented with analog circuitry;

said means for detecting valid transitions is implemented in the form selected from the group consisting of digital circuitry, digital logic, and an algorithm on a digital computer;

said means for generating said output is implemented in a form selected from the group consisting of digital circuitry, digital logic, and an algorithm on a digital computer.

26. The linear optic flow sensor system of claim 25 further including: a means of digitizing said feature signals, wherein said thresholding circuit is implemented in the form selected from the group consisting of digital circuitry, digital logic, and an algorithm on a digital computer.

27. The linear optic flow sensor system of claim 25 wherein said feature location circuitry is implemented in analog circuitry.

* * * * *